United States Patent
Mukherjee et al.

(10) Patent No.: US 10,104,398 B2
(45) Date of Patent: Oct. 16, 2018

(54) SUPER-TRANSFORM VIDEO CODING

(71) Applicant: GOOGLE INC., Mountain View, CA (US)

(72) Inventors: Debargha Mukherjee, Cupertino, CA (US); Yue Chen, Sunnyvale, CA (US); Shunyao Li, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/700,238

(22) Filed: Sep. 11, 2017

(65) Prior Publication Data

US 2018/0014031 A1 Jan. 11, 2018

Related U.S. Application Data

(63) Continuation of application No. 14/823,269, filed on Aug. 11, 2015, now Pat. No. 9,769,499.

(51) Int. Cl.
| | |
|---|---|
| *H04N 19/61* | (2014.01) |
| *H04N 19/59* | (2014.01) |
| *H04N 19/176* | (2014.01) |
| *H04N 19/122* | (2014.01) |
| *H04N 19/583* | (2014.01) |
| *H04N 19/184* | (2014.01) |

(52) U.S. Cl.
CPC .......... *H04N 19/61* (2014.11); *H04N 19/122* (2014.11); *H04N 19/176* (2014.11); *H04N 19/184* (2014.11); *H04N 19/583* (2014.11); *H04N 19/59* (2014.11)

(58) Field of Classification Search
CPC .. H04N 19/122; H04N 19/176; H04N 19/184; H04N 19/583; H04N 19/59
See application file for complete search history.

(56) References Cited

U.S. PATENT DOCUMENTS

2014/0247868 A1* 9/2014 Oh ................. H04N 19/124
375/240.03
2015/0249840 A1* 9/2015 Kim ................ H04N 19/149
375/240.2

* cited by examiner

*Primary Examiner* — Jonathan R Messmore
(74) *Attorney, Agent, or Firm* — Young Basile Hanlon & MacFarlane, P.C.

(57) ABSTRACT

Super-transform coding may include identifying a plurality of sub-blocks for prediction coding a current block, determining whether to encode the current block using a super-transform, and super-prediction coding the current block. Super-prediction coding may include generating a super-prediction block for the current block by generating a prediction block for each unpartitioned sub-block of the current block, generating a super-prediction block for each partitioned sub-block of the current block by super-prediction coding the sub-block, and including the prediction blocks and super-prediction blocks for the sub-blocks in a super-prediction block for the current block. Including the prediction blocks and super-prediction blocks for the sub-blocks in a super-prediction block for the current block may include filtering at least a portion of each prediction block and each super-prediction block based on a spatially adjacent prediction block. Super-transform coding may include transforming the super-prediction block for the current block using a corresponding super-transform.

20 Claims, 19 Drawing Sheets

SUPER-TRANSFORM VIDEO CODING

CROSS-REFERENCE TO RELATED APPLICATION(S)

This application is a continuation of U.S. patent application Ser. No. 14/823,269, filed Aug. 11, 2015, now U.S. Pat. No. 9,769,499, the entire disclosure of which is hereby incorporated by reference.

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide high resolution video transmitted over communications channels having limited bandwidth.

SUMMARY

This application relates to encoding and decoding of video stream data for transmission or storage. Disclosed herein are aspects of systems, methods, and apparatuses for encoding and decoding using super-transform coding.

An aspect is an apparatus for use in super-transform coding, the apparatus comprising a non-transitory computer-readable memory including instructions for super-transform coding, and a processor, operatively coupled to the non-transitory computer-readable memory, for receiving the instructions from the non-transitory computer-readable memory and executing the instructions for super-transform coding comprising identifying an input block from a current frame from an input video stream, and super-transform coding the input block using the input block as a current block. Super-transform coding may include, in response to a determination to encode the current block using a prediction block size corresponding to a size of the current block, determining a prediction block corresponding to the current block, the prediction block having a prediction block size corresponding to the size of the current block, and generating a transform block based on the prediction block using a transform having a transform size within the prediction block size. Super-transform coding may include, in response to a determination to encode the current block using a prediction block size smaller than the size of the current block, identifying a plurality of sub-blocks from the current block for prediction coding the current block, wherein a first sub-block from the plurality of sub-blocks is spatially adjacent to a second sub-block from the plurality of sub-blocks in the current block, in response to a determination to encode the current block using a transform having a transform size smaller than the size of the current block, super-transform coding each sub-block from the plurality of sub-blocks using the respective sub-block as the current block, and in response to a determination to encode the current block using a super-transform having a super-transform size corresponding to the size of the current block, generating, as the transform block, a super-transform block by transforming a super-prediction block for the current block using the super-transform, wherein the super-prediction block for the current block has a super-prediction block size corresponding to the size of the current block, and wherein generating the super-transform block includes generating the super-prediction block for the current block by super-prediction coding the current block. Super-prediction coding may include, for each sub-block from the plurality of sub-blocks, in response to a determination to encode the sub-block using a prediction block size corresponding to a size of the sub-block, determining a prediction block for the sub-block based on a motion vector associated with the sub-block, in response to a determination to encode the sub-block using a prediction block size smaller than the size of the sub-block, identifying a plurality of partitions from the sub-block for prediction coding the sub-block, wherein a first partition from the plurality of partitions is spatially adjacent to a second partition from the plurality of partitions in the sub-block, and generating, as the prediction block, a super-prediction block for the sub-block, wherein the super-prediction block for the sub-block has a super-prediction block size corresponding to the size of the sub-block, wherein generating the super-prediction block for the sub-block includes super-prediction coding the sub-block using the sub-block as the current block and using the plurality of partitions as the plurality of sub-blocks, generating a filtered prediction block by filtering at least a portion of the prediction block based on a spatially adjacent prediction block from the super-prediction block for the current block, and including the filtered prediction block in the super-prediction block for the current block, and including the transform block in an output bitstream. The processor may execute the instructions to transmit or store the output bitstream.

Another aspect is an apparatus for use in super-transform coding, the apparatus comprising a non-transitory computer-readable memory including instructions for super-transform coding, and a processor, operatively coupled to the non-transitory computer-readable memory, for receiving the instructions from the non-transitory computer-readable memory and executing the instructions for super-transform coding comprising identifying an input block from a current frame from an input video stream, and super-transform coding the input block using the input block as a current block. Super-transform coding may include, in response to a determination to encode the current block using a prediction block size corresponding to a size of the current block, determining a prediction block corresponding to the current block, the prediction block having a prediction block size corresponding to the size of the current block, and generating a transform block based on the prediction block using a transform having a transform size within the prediction block size. Super-transform coding may include, in response to a determination to encode the current block using a prediction block size smaller than the size of the current block, identifying a plurality of sub-blocks from the current block for prediction coding the current block, wherein a first sub-block from the plurality of sub-blocks is spatially adjacent to a second sub-block from the plurality of sub-blocks in the current block, in response to a determination to encode the current block using a transform having a transform size smaller than the size of the current block, super-transform coding each sub-block from the plurality of sub-blocks using the respective sub-block as the current block, and, in response to a determination to encode the current block using a super-transform having a super-transform size corresponding to the size of the current block, generating, as the transform block, a super-transform block by transforming a super-prediction block for the current block using the super-transform, wherein the super-prediction block for the current block has a super-prediction block size corresponding to the size of the current block, and wherein generating the super-transform block includes generating the super-prediction block for the current block by super-prediction coding the current block. Super-prediction coding may include, for each sub-block from the plurality of sub-blocks, in response to a determination to encode the sub-block using a prediction block size corresponding to a size of the sub-block, determining an extended prediction block size, wherein determining the extended prediction block size includes extending the prediction block size by a super-prediction extension size, and determining the prediction block based on the extended prediction block size, the super-transform, and a motion vector associated with the sub-block, in response to a determination to encode the sub-block using a prediction block size smaller than the size of the sub-block, identifying a plurality of partitions from the sub-block for prediction coding the sub-block, wherein a first partition from the plurality of partitions is spatially adjacent to a second partition from the plurality of partitions in the sub-block, and generating, as the prediction block, a super-prediction block for the sub-block, wherein the super-prediction block for the sub-block has a super-prediction block size corresponding to the size of the sub-block, wherein generating the super-prediction block for the sub-block includes super-prediction coding the sub-block using the sub-block as the current block and using the plurality of partitions as the plurality of sub-blocks, generating a filtered prediction block by filtering at least a portion of the prediction block based on a spatially adjacent prediction block from the super-prediction block for the current block, and including the filtered prediction block in the super-prediction block for the current block. Super-transform coding may include, including the transform block in an output bitstream. The processor may execute the instructions to transmit or store the output bitstream.

Another aspect is an apparatus for use in super-transform coding, the apparatus comprising a non-transitory computer-readable memory including instructions for super-transform coding, and a processor, operatively coupled to the non-transitory computer-readable memory, for receiving the instructions from the non-transitory computer-readable memory and executing the instructions for super-transform coding comprising identifying a plurality of sub-blocks for prediction coding a current block, and, in response to a determination to encode the current block using a super-transform, super-prediction coding the current block. Super-prediction coding may include generating a super-prediction block for the current block. Generating a super-prediction block for the current block may include, for each unpartitioned sub-block from the current block, generating a prediction block, and including the prediction block in the super-prediction block for the current block. Generating a super-prediction block for the current block may include, for each partitioned sub-block from the current block, generating a super-prediction block for the sub-block by super-prediction coding the sub-block, and including the super-prediction block for the sub-block as a prediction block in the super-prediction block for the current block. Generating a super-prediction block for the current block may include filtering at least a portion of each prediction block from the super-prediction block for the current block based on a spatially adjacent prediction block from the super-prediction block for the current block. Super-prediction coding may include generating a residual based on the super-prediction block for the current block, generating a plurality of transform coefficients by transforming the residual using a super-transform having a super-transform size corresponding to a size of the current block, including the plurality of transform coefficients in an output bitstream, and including a super-transform flag in the output bitstream. The processor may execute the instructions to transmit or store the output bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Video compression schemes may include breaking each image, or frame, into smaller portions, such as blocks, and generating an output bitstream using techniques to limit the information included for each block in the output. An encoded bitstream can be decoded to recreate the blocks and the source images from the limited information. In some implementations, the information included for each block in the output may be limited by reducing spatial redundancy, reducing temporal redundancy, or a combination thereof.

Temporal redundancy may be reduced by using similarities between frames to encode a frame using a relatively small amount of data based on one or more reference frames, which may be previously encoded, decoded, and reconstructed frames of the video stream. Reducing temporal redundancy may include partitioning a block of a frame, identifying a prediction block from a reference frame corresponding to each partition, and determining a difference between the partition and the prediction block as a residual block. Reducing spatial redundancy may include transforming the residual block into the frequency domain using a transform that is the same size, or smaller, than the partition. However, using a transform that is the same size, or smaller, than the partition may not optimally compress the residual.

In some implementations, video coding using super-transform coding may include improving compression performance by using a transform that is larger than the corresponding partition and filtering the prediction blocks to reduce discontinuities between adjacent prediction blocks within a super-transform.

Figure 1:
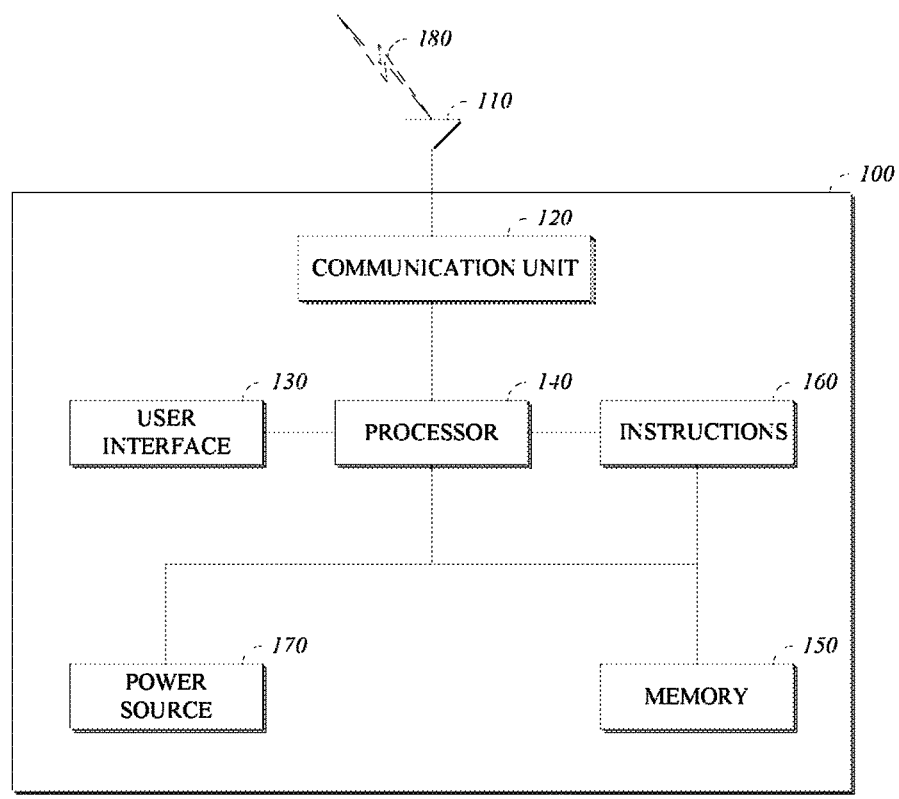
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a special purpose processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled to the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
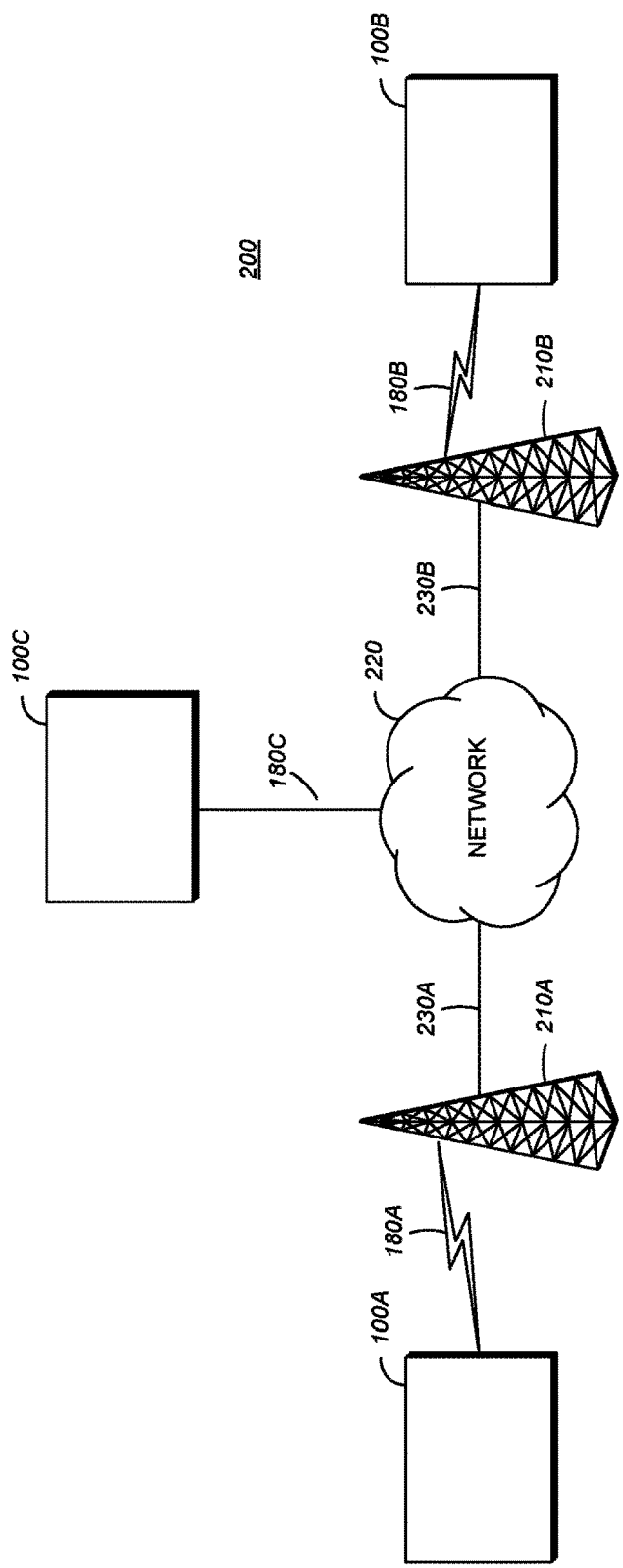
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via a wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation, the network 220 can be an ad-hoc network and can omit one or more of the access points 210A/210B. The computing and communications system 200 may include devices, units, or elements not shown in FIG. 2. For example, the computing and communications system 200 may include many more communicating devices, networks, and access points.

Figure 3:
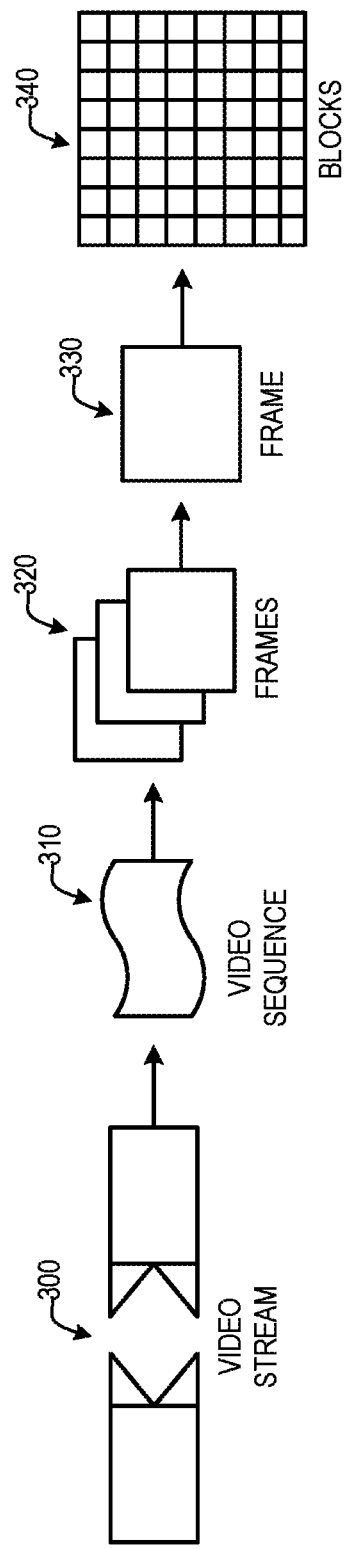
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
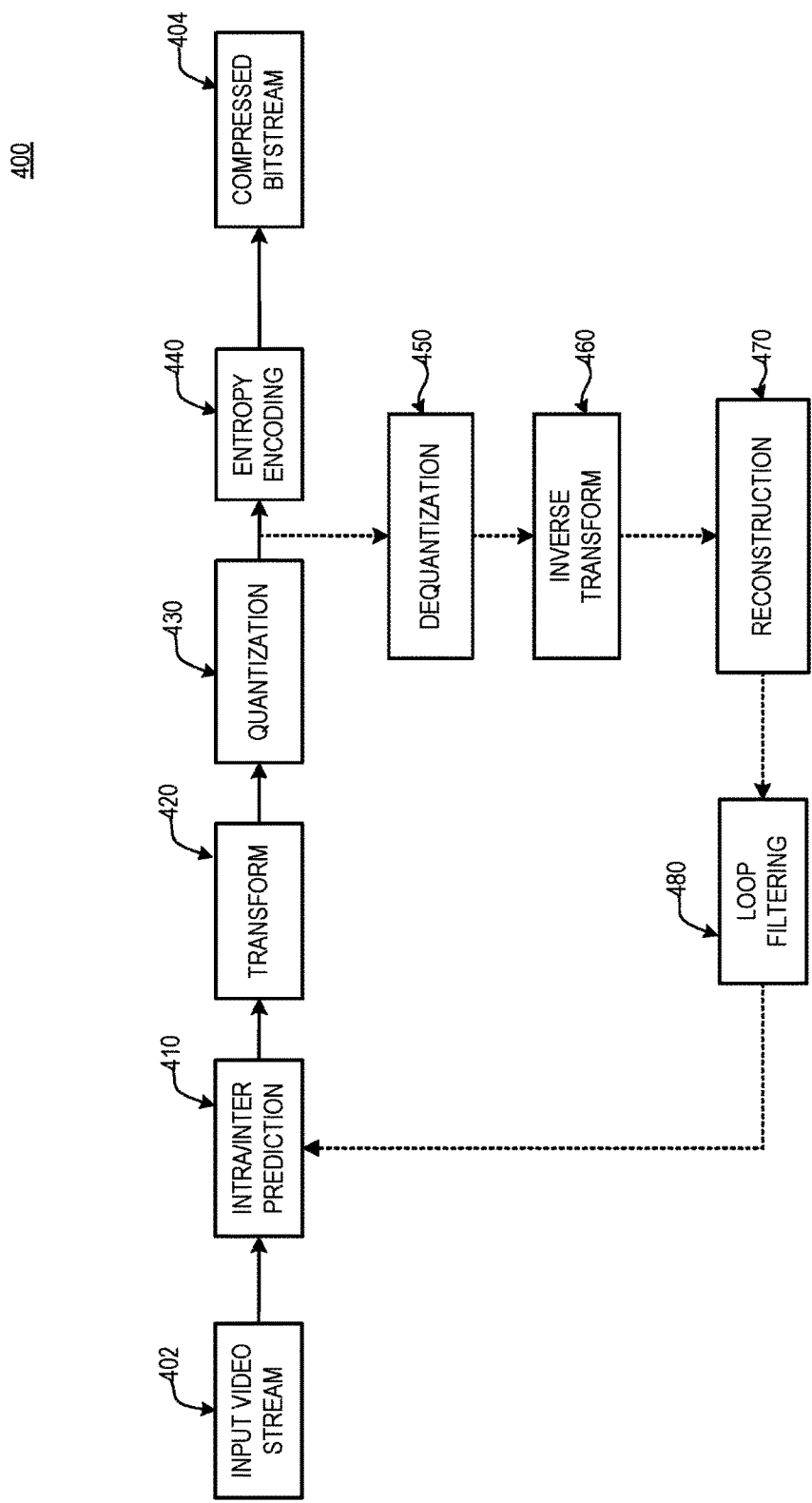
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
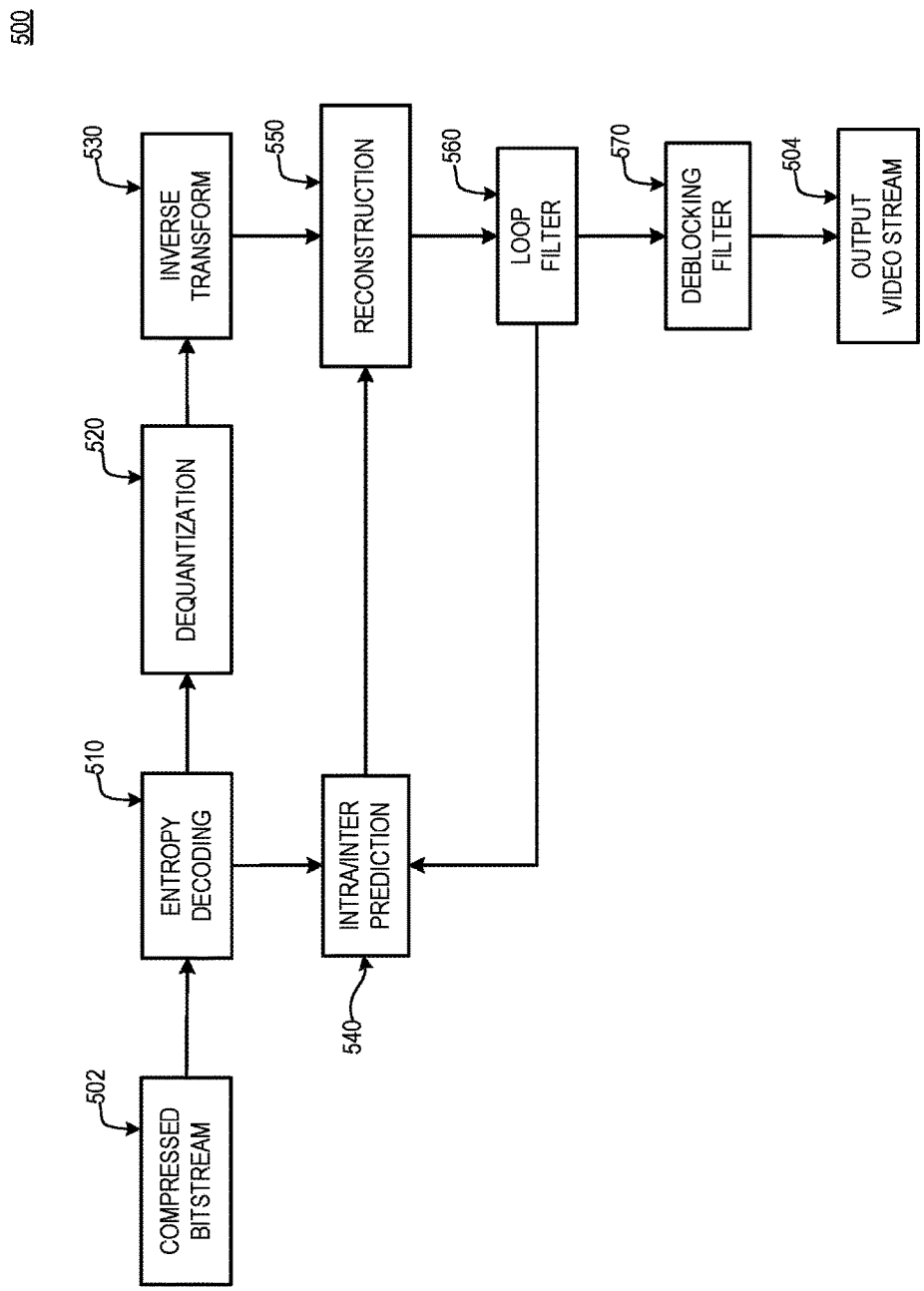
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
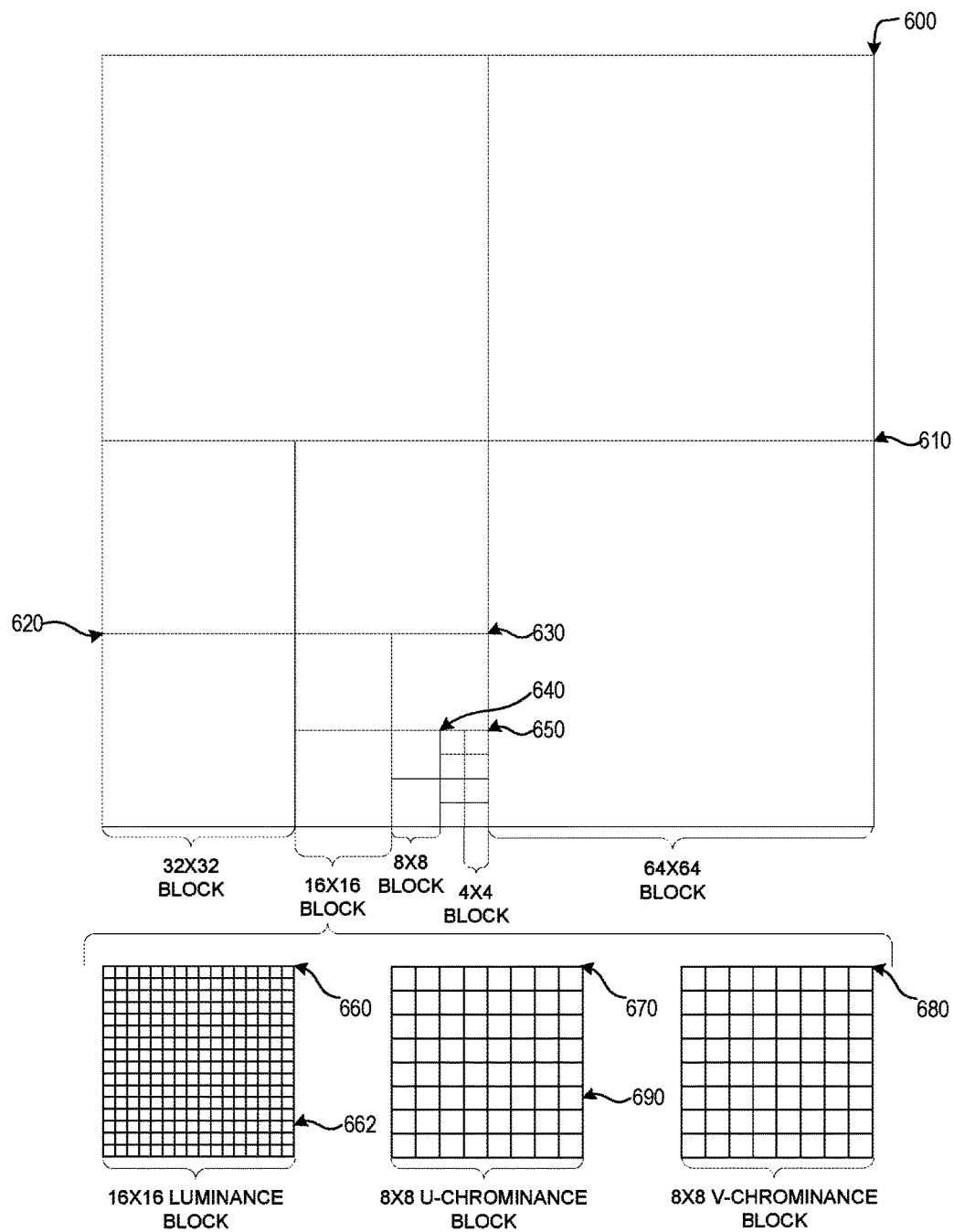
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670/680, such as a U or Cb chrominance block 670, and a V or Cr chrominance block 680. The chrominance blocks 670/680 may include chrominance pixels 690. For example, the luminance block 660 may include 16×16 luminance pixels 662 and each chrominance block 670/680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×z32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a block or pixel in a reference frame, or a portion of the reference frame, that corresponds to a current block or pixel of a current frame. For example, a reference frame, or a portion of a reference frame, which may be stored in memory, may be searched for the best block or pixel to use for encoding a current block or pixel of the current frame. For example, the search may identify the block of the reference frame for which the difference in pixel values between the reference block and the current block is minimized, and may be referred to as motion searching. In some implementations, the portion of the reference frame searched may be limited. For example, the portion of the reference frame searched, which may be referred to as the search area, may include a limited number of rows of the reference frame. In an example, identifying the reference block may include calculating a cost function, such as a sum of absolute differences (SAD), between the pixels of the blocks in the search area and the pixels of the current block.

In some implementations, the spatial difference between the location of the reference block in the reference frame and the current block in the current frame may be represented as a motion vector. The difference in pixel values between the reference block and the current block may be referred to as differential data, residual data, or as a residual block. In some implementations, generating motion vectors may be referred to as motion estimation, a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two dimensional data structure such as a matrix as shown, or in a one dimensional data structure, such as a vector array. In an implementation, a representation of the frame, such as a two dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block based coding efficiency may be improved by partitioning blocks into one or more partitions, which may be rectangular, including square, partitions. In some implementations, video coding using partitioning may include selecting a partitioning scheme from among multiple candidate partitioning schemes. For example, in some implementations, candidate partitioning schemes for a 64×64 coding unit may include rectangular size partitions ranging in sizes from 4×4 to 64×64, such as 4×4, 4×8, 8×4, 8×8, 8×16, 16×8, 16×16, 16×32, 32×16, 32×z32, 32×64, 64×32, or 64×64. In some implementations, video coding using partitioning may include a full partition search, which may include selecting a partitioning scheme by encoding the coding unit using each available candidate partitioning scheme and selecting the best scheme, such as the scheme that produces the least rate-distortion error.

In some implementations, encoding a video frame may include identifying a partitioning scheme for encoding a current block, such as block 610. In some implementations, identifying a partitioning scheme may include determining whether to encode the block as a single partition of maximum coding unit size, which may be 64×64 as shown, or to partition the block into multiple partitions, which may correspond with the sub-blocks, such as the 32×32 blocks 620 the 16×16 blocks 630, or the 8×8 blocks 640, as shown, and may include determining whether to partition into one or more smaller partitions. For example, a 64×64 block may be partitioned into four 32×32 partitions. Three of the four 32×32 partitions may be encoded as 32×32 partitions and the fourth 32×32 partition may be further partitioned into four 16×16 partitions. Three of the four 16×16 partitions may be encoded as 16×16 partitions and the fourth 16×16 partition may be further partitioned into four 8×8 partitions, each of which may be encoded as an 8×8 partition. In some implementations, identifying the partitioning scheme may include using a partitioning decision tree.

In some implementations, video coding for a current block may include identifying an optimal coding mode from multiple candidate coding modes, which may provide flexibility in handling video signals with various statistical properties, and may improve the compression efficiency. For example, a video coder may evaluate each candidate coding mode to identify the optimal coding mode, which may be, for example, the coding mode that minimizes an error metric, such as a rate-distortion cost, for the current block. In some implementations, the complexity of searching the candidate coding modes may be reduced by limiting the set of available candidate coding modes based on similarities between the current block and a corresponding prediction block. In some implementations, the complexity of searching each candidate coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

Figure 7:
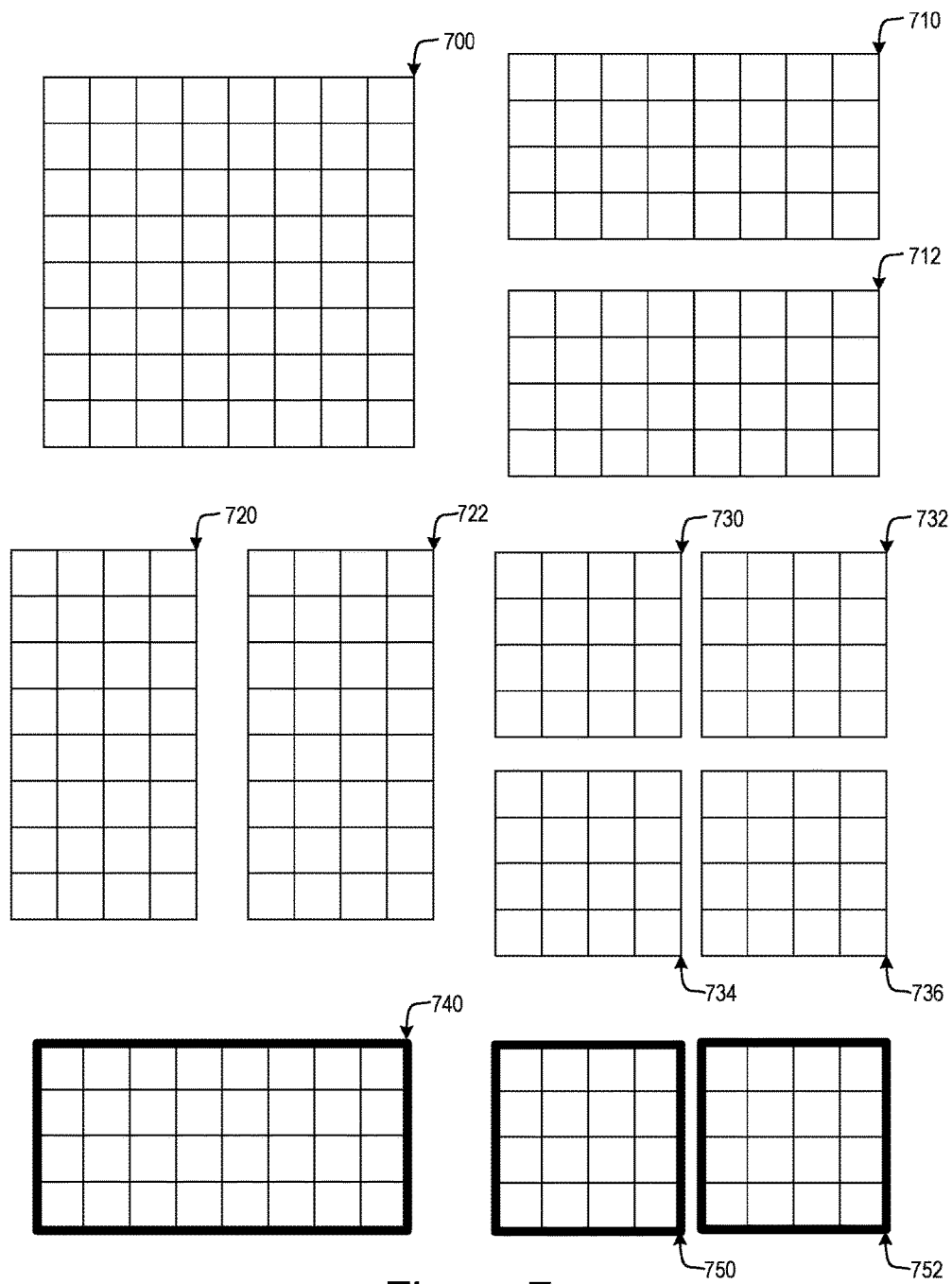
FIG. 7 is a block diagram of a representation of an 8×8 block 700 in accordance with implementations of this disclosure.

FIG. 7 is a block diagram of a representation of an 8×8 block 700 in accordance with implementations of this disclosure. In some implementations, a block, such as the 8×8 block 700 shown, may be partitioned into multiple partitions, or sub-blocks. In some implementations, a block, such as the 8×8 block 700 shown, may be horizontally partitioned into a top partition, or sub-block, 710 and a bottom partition, or sub-block, 712. In some implementations, a block, such as the 8×8 block 700 shown, may be vertically partitioned into a left partition, or sub-block, 720 and a right partition, or sub-block, 712. In some implementations, a block, such as the 8×8 block 700 shown, may be split partitioned into a top-left partition, or sub-block, 730, a top-right partition, or sub-block, 732, a bottom-left partition, or sub-block, 734, and a bottom-right partition, or sub-block, 736.

In some implementations, video coding, such as the video coding shown in FIG. 4, may include prediction coding, such as the prediction coding performed by the intra/inter prediction unit 410 shown in FIG. 4. In some implementations, prediction coding may include identifying a motion vector indicating a spatial, temporal, or spatiotemporal offset, which may be zero, between a block, or sub-block, and a prediction block in a reference frame, which may be the current frame or a previously constructed or reconstructed frame.

In some implementations, prediction coding may include identifying a prediction block corresponding to each unpartitioned sub-block in the current block. For example, the block 700 shown in FIG. 7 may be split partitioned into a top-left sub-block 730, a top-right sub-block 732, a bottom-left sub-block 734, and a bottom-right sub-block 736, as shown, and a prediction block corresponding to each of the four partitions may be identified. In another example, the partitioning mode for the current block may be vertical partitioning, a prediction block corresponding to the left vertical partition 720, and a prediction block corresponding to the right vertical partition 722 may be identified. In another example, the partitioning mode for the current block may be horizontal partitioning, a prediction block corresponding to the top horizontal partition 710, and a prediction block corresponding to the bottom horizontal partition 712 may be identified. In another example, the partitioning mode for the current block may be none, which may indicate no partitioning for the current block and a prediction block corresponding to the current block may be identified. In some embodiments, partitioning a current block may be limited by a minimum partition size, such as 4×4.

In some implementations, video coding, such as the video coding shown in FIG. 4, may include transform coding, such as the transform coding performed by the transform unit 420 shown in FIG. 4. For example, a difference between a current block, or sub-block, and a prediction block identified for the current block, or sub-block, may be identified as a residual block, and a transform may be identified for transforming the residual block. In some implementations, transform coding may include identifying a transform having a transform size within the prediction block size, which may include transform sizes equal to or smaller than the prediction block size. For example, the top partition 710 shown in FIG. 7 is a 4×8 sub-block, and transforming the top partition 710 may include generating a 4×8 prediction block, generating a 4×8 residual block, identifying a transform having a transform size equal to the prediction block size, such as the 4×8 transform 740, or smaller than the prediction block size, such as the left 4×4 transform 750 and the right 4×4 transform 752, and generating transform coefficients using the identified transforms. In some implementations, transform coding may include using a minimum transform size indicated a smallest available transform size.

Figure 8:
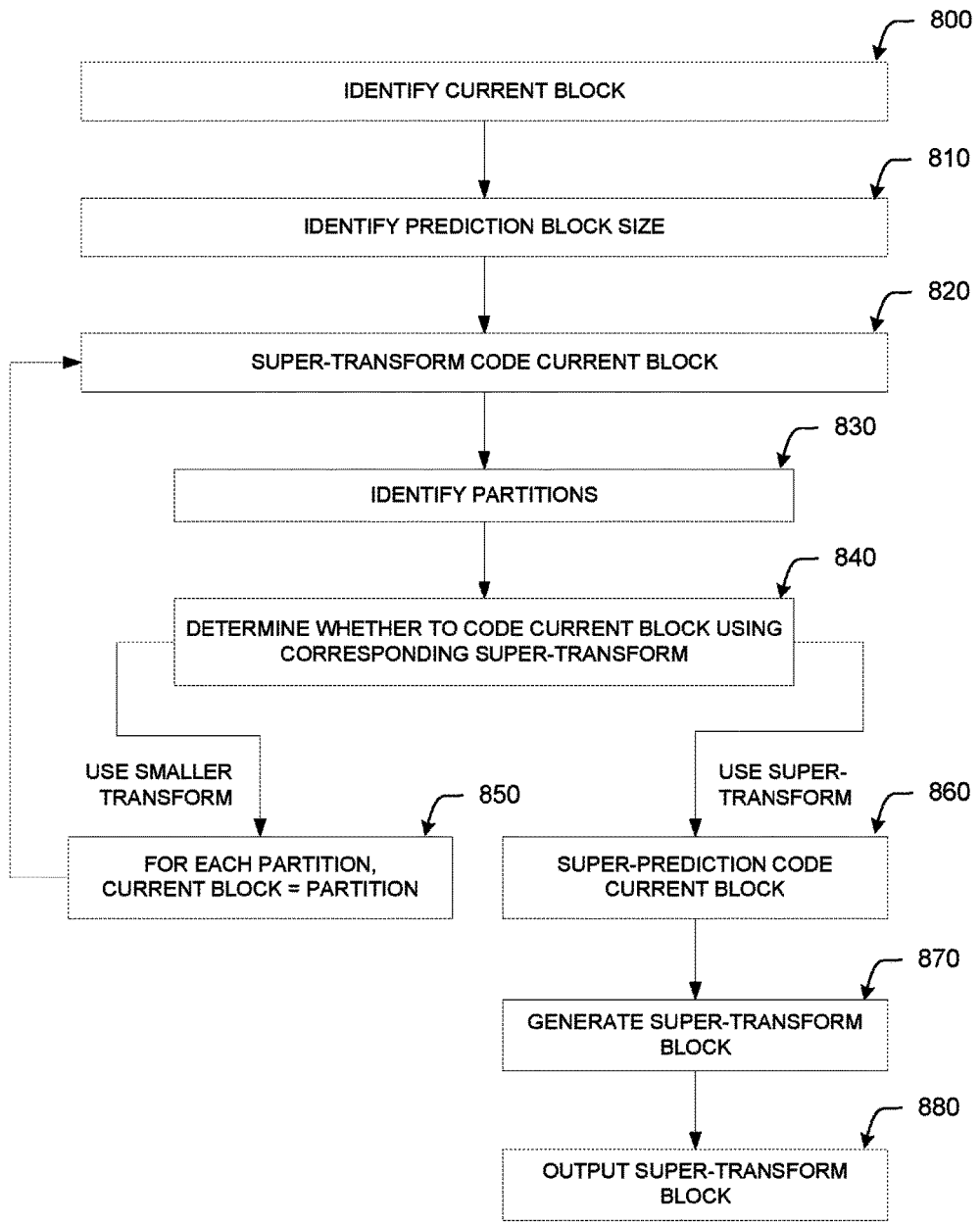
FIG. 8 is a diagram of an example of video coding including super-transform coding in accordance with implementations of this disclosure.

FIG. 8 is a diagram of an example of video coding including super-transform coding in accordance with implementations of this disclosure. In some implementations, video coding may include super-transform coding. For example, a transform unit, such as the transform unit 420 shown in FIG. 4, of an encoder, such as the encoder 400 shown in FIG. 4, may perform super-transform coding. In some implementations, video coding including super-transform coding may include identifying a current block at 800, identifying a prediction block size at 810, super-transform coding the current block at 820, or a combination thereof.

In some implementations, a current block may be identified at 800. For example, a 64×64 block, such as the bottom-left 64×64 block 610 shown in FIG. 6, may be identified as the current block.

In some implementations, a prediction block size may be identified at 810. In some implementations, identifying the prediction block size may include determining whether to encode the current block using a prediction block size corresponding to, or the same as, the current block size, or to partition the current block and use a prediction block size smaller than the current block size.

In some implementations, super-transform coding may be performed concurrently with prediction coding. For example, the intra/inter prediction unit 410 may perform a partial or full rate distortion (RD), or other quality metric, search to identify an optimized partitioning decision tree for the current block, which may include, for each block, determining whether to partition the block, which may include determining whether to use an unpartitioned block and a transform the size of the unpartitioned block or smaller, or to partition the block and use a super-transform the size of the block, or to partition the block and use multiple smaller transforms. In some embodiments, the partitioning and super-transform decision may be determined based on a quality metric, such as rate distortion (RD).

In some implementations, super-transform coding may be performed subsequent to prediction coding and the prediction block size may be identified based on a previously generated partitioning decision tree or partitioning scheme. In some implementations, the prediction block size may be identified as corresponding to the current block size and the current block may be coded using transform coding (not shown). For example, the current block may be a 64×64 block, which may not be partitioned, a 64×64 prediction block may be generated, and a the 64×64 prediction block may be transformed using transform coding, which may include using a 64×64, or smaller, transform. In some implementations, the prediction block size may be identified as being smaller than the current block size, which may indicate that the current block is partitioned into multiple sub-blocks, and the current block may be coded using super-transform coding at 820.

Although not shown separately in FIG. 8, in some implementations, super-transform coding the current block at 820 may include determining whether to encode the current block using a prediction block size corresponding to the current block size. For example, the current block may be a 64×64 block and super-transform coding the current block at 820 may include determining whether to encode the 64×64 current block using a 64×64 prediction block size.

Although not shown separately in FIG. 8, in some implementations, super-transform coding the current block at 820 may include transform coding the current block in response to a determination to encode the current block using a prediction block size corresponding to the current block size. In some implementations, transform coding the current block in response to a determination to encode the current block using a prediction block size corresponding to the current block size may include determining a prediction block corresponding to the current block, generating a transformed block based on the prediction block using a transform having a transform size within, such as equal to or less than, the prediction block size, including the transformed block in an output bitstream, or a combination thereof. For example, the current block may be a 64×64 block and transform coding the current 64×64 block in response to a determination to encode the current 64×64 block using a 64×64 prediction block size may include determining a 64×64 prediction block corresponding to the current block, generating a 64×64 transformed block based on the 64×64 prediction block using a 64×64, or smaller, transform, and including the 64×64 transformed block in an output bitstream.

In some implementations, such as in response to a determination to encode the current block using a prediction block size smaller than the current block size, super-transform coding at 820 may include identifying partitions within the current block at 830, determining whether to code the current block using a corresponding super-transform at 840, super-transform coding each partition at 850, super-prediction coding the current block at 860, generating a super-transform block at 870, outputting the super-transform block at 880, or a combination thereof. In some implementations, super-transform coding the current block may include recursively super-transform coding the current block. Recursively super-transform coding the current block may include recursively super-transform coding the current block based on recursively super-transform coding each partition within the current block.

In some implementations, partitions may be identified within the current block at 830. For example, the current block may be horizontally partitioned and a top partition and a bottom partition may be identified at 830. The top partition may be spatially adjacent to the bottom partition. In another example, the current block may be vertically partitioned and a left partition and a right partition may be identified at 830. The left partition may be spatially adjacent to the right partition. In another example, the current block may be split partitioned and a top-left partition, a top-right partition, a bottom-left partition, and a bottom-right partition may be identified at 830. Each of the partitions may be spatially adjacent to each of the other partitions. Although vertical, horizontal, and split mode partitioning is described herein, any partitioning scheme may be used.

In some implementations, whether to code the current block using a corresponding super-transform may be determined at 840. In some implementations, super-transform coding, or a portion thereof, may be performed concurrently with prediction coding, and whether to code the current block using a corresponding super-transform may be determined at 840 based on a quality metric, such as a rate-distortion (RD) metric.

In some implementations, prediction coding may include generating an indication of a super-transform size for a current block and determining whether to code the current block using a corresponding super-transform at 840 may be based on the super-transform size indication. For example, prediction coding may include generating a partitioning decision tree, which may include an indication to use a super-transform corresponding to a branch, or the root, of the partitioning decision tree. For example, the current block may be a 64×64 block, the partitioning decision tree may indicate partitioning for the 64×64 block and may indicate the use of a 64×64 super-transform. In another example, the current block may be a 64×64 block, the partitioning decision tree may indicate partitioning for the 64×64 block, may omit an indication of the use of a 64×64 super-transform, may indicate partitioning for a first sub-block of the 64×64 block, such as a 32×32 block, may indicate the use of a 32×32 super-transform for the first 32×32 sub-block, may indicate no partitioning for a second 32×32 sub-block, may indicate partitioning for a third 32×32 sub-block, may omit an indication of the use of a 32×32 super-transform for the third 32×32 sub-block or any other partition with the third 32×32 sub-block, may indicate partitioning for a fourth 32×32 sub-block, may omit an indication of the use of a 32×32 super-transform for the fourth 32×32 sub-block, may indicate partitioning for a first sub-block of the fourth 32×32 block, such as a 16×16 block, may indicate the use of a 16×16 super-transform for the first 16×16 sub-block, may indicate no partitioning for a second 16×16 sub-block, may indicate partitioning for a third 16×16 sub-block, may omit an indication of the use of a 16×16 super-transform for the third 16×16 sub-block or any other partition with the third 16×16 sub-block, may indicate partitioning for a fourth 16×16 sub-block, may omit an indication of the use of a 16×16 super-transform for the fourth 16×16 sub-block, and may indicate partitioning for a first sub-block of the fourth 16×16 block, such as an 8×8 block, may indicate the use of an 8×8 super-transform for the first 8×8 sub-block, may indicate no partitioning for a second 8×8 sub-block, may indicate partitioning for a third 8×8 sub-block, may omit an indication of the use of an 8×8 super-transform for the third 8×8 sub-block or any other partition with the third 8×8 sub-block, may indicate partitioning for a fourth 8×8 sub-block, may omit an indication of the use of a 8×8 super-transform for the fourth 8×8 sub-block.

In some implementations, in response to a determination at 840 to omit encoding the current block using a super-transform size corresponding to the current block size, such as a decision to encode the current block using a smaller transform size, each partition, or sub-block, of the current block may be super-transform coded at 850. In some implementations, within the context of super-transform coding a sub-block, super-transform coding may include using the sub-block as the current block and using the sub-block size of the sub-block as the current block size.

Figure 9:
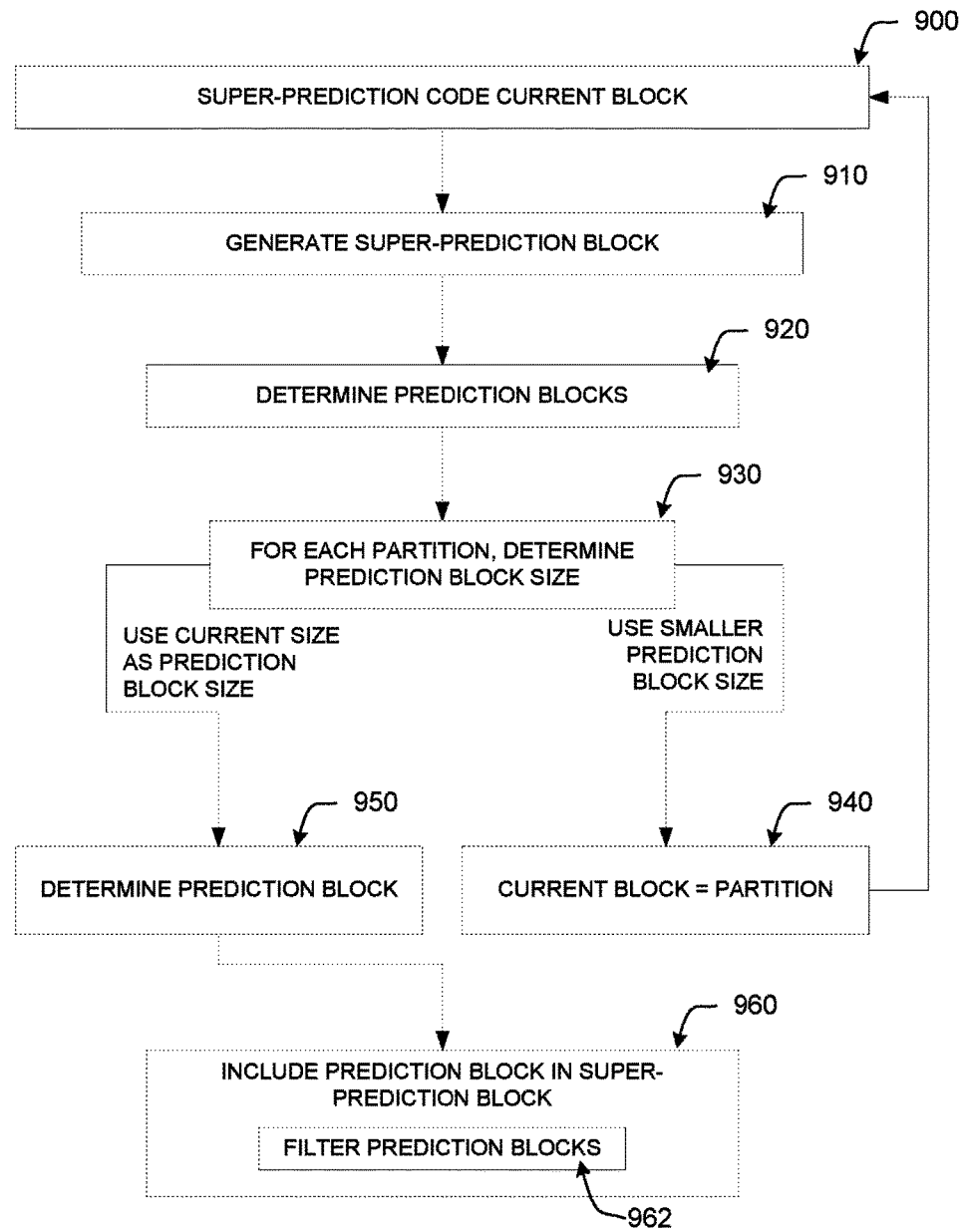
FIG. 9 is a diagram of an example of super-prediction coding in accordance with implementations of this disclosure.

In some implementations, in response to a determination at 840 to encode the current block using a super-transform size corresponding to the current block size, the current block may be super-prediction coded at 860, which may include generating a super-prediction block. For example, the current block may be super-prediction coded as shown in FIG. 9. In some implementations, the super-prediction block may have a super-prediction block size corresponding, or equal to, the current block size.

In some implementations, a super-transform block may be generated at 870. In some implementations, generating a super-transform block at 870 may include determining a residual block indicating a difference between the current block and the super-prediction block, transforming the residual block using the super-transform, or a combination thereof. For example, the super-prediction block may be a N×N block, such as a 64×64 block (N=64), the residual may be a N×N block, such as a 64×64 block (N=64), the super-transform may have a super-transform size of N×N, such as 64×64, and the super-transform block may be a N×N block, such as a 64×64 block (N=64).

In some implementations, the super-transform block may be output at 880. For example, the super-transform block may be included in an output bitstream. In some implementations, including the super-transform block in the output bitstream may include further processing the super-transform block. For example, the super-transform block may include transform coefficients, the transform coefficients may be quantized, the quantized transform coefficients may be entropy coded, and the entropy coded quantized transform coefficients may be included in the output bitstream.

Other implementations of the diagram of super-transform coding as shown in FIG. 8 are available. In implementations, additional elements of super-transform coding can be added, certain elements can be combined, and/or certain elements can be removed. For example, in an implementation, super-transform coding can be combined with prediction coding.

FIG. 9 is a diagram of an example of super-prediction coding in accordance with implementations of this disclosure. In some implementations, video coding may include super-transform coding, which may include super-prediction coding. In some implementations, super-prediction coding at 900 may include generating a super-prediction block at 910. In some implementations, the size of the super-prediction block generated at 910 may correspond to, or equal, the size of the current block. For example, the current block may be an N×N block, such as a 64×64 block, partitioned into two or more smaller prediction blocks, and the super-prediction block may be an N×N super-prediction blocks, such as a 64×64 super-prediction block.

In some implementations, generating the super-prediction block at 910 may include determining prediction blocks at 920. For example, a prediction block may be determined for each partition, or sub-block, of the current block. For example, the current block may be partitioned using horizontal partitioning and may include a top partition, or sub-block, and a bottom partition, or sub-block, a top prediction block may be determined for the top sub-block and bottom prediction block may be determined for the bottom sub-block. In another example, the current block may be partitioned using vertical partitioning and may include a left partition, or sub-block, and a right partition, or sub-block, a left prediction block may be determined for the left sub-block and right prediction block may be determined for the right sub-block. In another example, the current block may be partitioned using split partitioning and may include a top-left partition, a top-right partition, a bottom-left partition, and a bottom-right partition, a top-left prediction block may be determined for the top-left sub-block, a top-right prediction block may be determined for the top-right sub-block, a bottom-left prediction block may be determined for the bottom-left sub-block, and a bottom-right prediction block may be determined for the bottom-right sub-block.

In some implementations, determining the prediction blocks at 920 may include, for each partition of the current block, determining a prediction block size at 930. For example, determining the prediction block size for a partition at 930 may include determining whether to use a prediction block size corresponding to the sub-block size or to partition the sub-block and use a prediction block size smaller than the sub-block size.

In some implementations, in response to a determination to use a prediction block size smaller than the sub-block size, the sub-block may be super-prediction coded at 940. In some implementations, within the context of super-prediction coding a sub-block, super-prediction coding may include using the sub-block as the current block and using the sub-block size of the sub-block as the current block size.

In some implementations, in response to a determination to use a prediction block size corresponding, or equal, to the sub-block size, a prediction block having a prediction block size corresponding to the sub-block size may be determined for the sub-block at 950. Each of the prediction blocks identified at 920 may be included in the super-prediction block at 960. In some implementations, including the prediction blocks identified at 920 in the super-prediction block at 960 may include filtering the prediction blocks at 962.

In an example, a 16×16 current block may be super-prediction coded at 900, which may include generating a 16×16 super-prediction block for the 16×16 current block at 910, which may include identifying prediction blocks for the 16×16 current block at 920. The 16×16 current block may be partitioned into four 8×8 sub-blocks, and a prediction block size may be determined for each 8×8 sub-block at 930. The prediction block size for the first 8×8 sub-block may be identified as being smaller than the 8×8 sub-block size, which may indicate partitioning for that the first 8×8 sub-block, and the first 8×8 sub-block may be used as the current block at 940 for super-prediction coding at 900, which may include generating an 8×8 super-prediction block for the 8×8 current block at 910, which may include identifying prediction blocks for the 8×8 current block at 920. The 8×8 current block may be partitioned into four 4×4 sub-blocks, which may be the minimum prediction block size, a prediction block size of 4×4 may be determined for each 4×4 sub-block at 930, a 4×4 prediction block may be determined for each 4×4 sub-block at 950, and the 4×4 prediction blocks may be included in the 8×8 super-prediction block at 960.

The prediction block size for the second 8×8 sub-block may be identified as being 8×8 at 930, and a first 8×8 prediction block may be determined for the second 8×8 sub-block at 950. The prediction block size for the third 8×8 sub-block may be identified as being 8×8 at 930, and a second 8×8 prediction block may be determined for the third 8×8 sub-block at 950. The prediction block size for the fourth 8×8 sub-block may be identified as being 8×8 at 930, and a third 8×8 prediction block may be determined for the fourth 8×8 sub-block at 950. The 8×8 super-prediction block for the first 8×8 sub-block, the 8×8 prediction block for the second 8×8 sub-block, the 8×8 prediction block for the third 8×8 sub-block, and the 8×8 prediction block for the fourth 8×8 sub-block, may be included in the 16×16 super-prediction block for the 16×16 block at 960.

In some implementations, including the prediction blocks in the super-prediction block at 960 may include spatial concatenation and filtering at 962 may be omitted. For example, an N×N current block may be horizontally partitioned, a top $$\frac{N}{2} \times N$$

prediction block may be included as the top $$\frac{N}{2} \times N$$

portion of the super-prediction block and a bottom $$\frac{N}{2} \times N$$

prediction block may be included as the bottom $$\frac{N}{2} \times N$$

portion of the super-prediction block. In another example, an N×N current block may be vertically partitioned, a left $$N \times \frac{N}{2}$$

prediction block may be included as the left $$N \times \frac{N}{2}$$

portion of the super-prediction block and a right $$N \times \frac{N}{2}$$

prediction block may be included as the right $$N \times \frac{N}{2}$$

portion of the super-prediction block. In another example, an N×N current block may be split partitioned, a top-left $$\frac{N}{2} \times \frac{N}{2}$$

prediction block may be included as the top-left $$\frac{N}{2} \times \frac{N}{2}$$

portion of the super-prediction block, a top-right right prediction block may be included as the top-right right $$\frac{N}{2} \times \frac{N}{2}$$

prediction block may be included as the top-right $$\frac{N}{2} \times \frac{N}{2}$$

portion of the super-prediction block, a bottom-left $$\frac{N}{2} \times \frac{N}{2}$$

prediction block may be included as the bottom-left $$\frac{N}{2} \times \frac{N}{2}$$

portion of the super-prediction block, and a bottom-right right $$\frac{N}{2} \times \frac{N}{2}$$

prediction block may be included as the bottom-right $$\frac{N}{2} \times \frac{N}{2}$$

portion of the super-prediction block. In some implementations, including the prediction blocks in the super-prediction block at 960 may include filtering at 962, as shown in FIGS. 10-17.

Other implementations of the diagram of super-prediction coding as shown in FIG. 9 are available. In implementations, additional elements of super-prediction coding can be added, certain elements can be combined, and/or certain elements can be removed.

Figure 10:
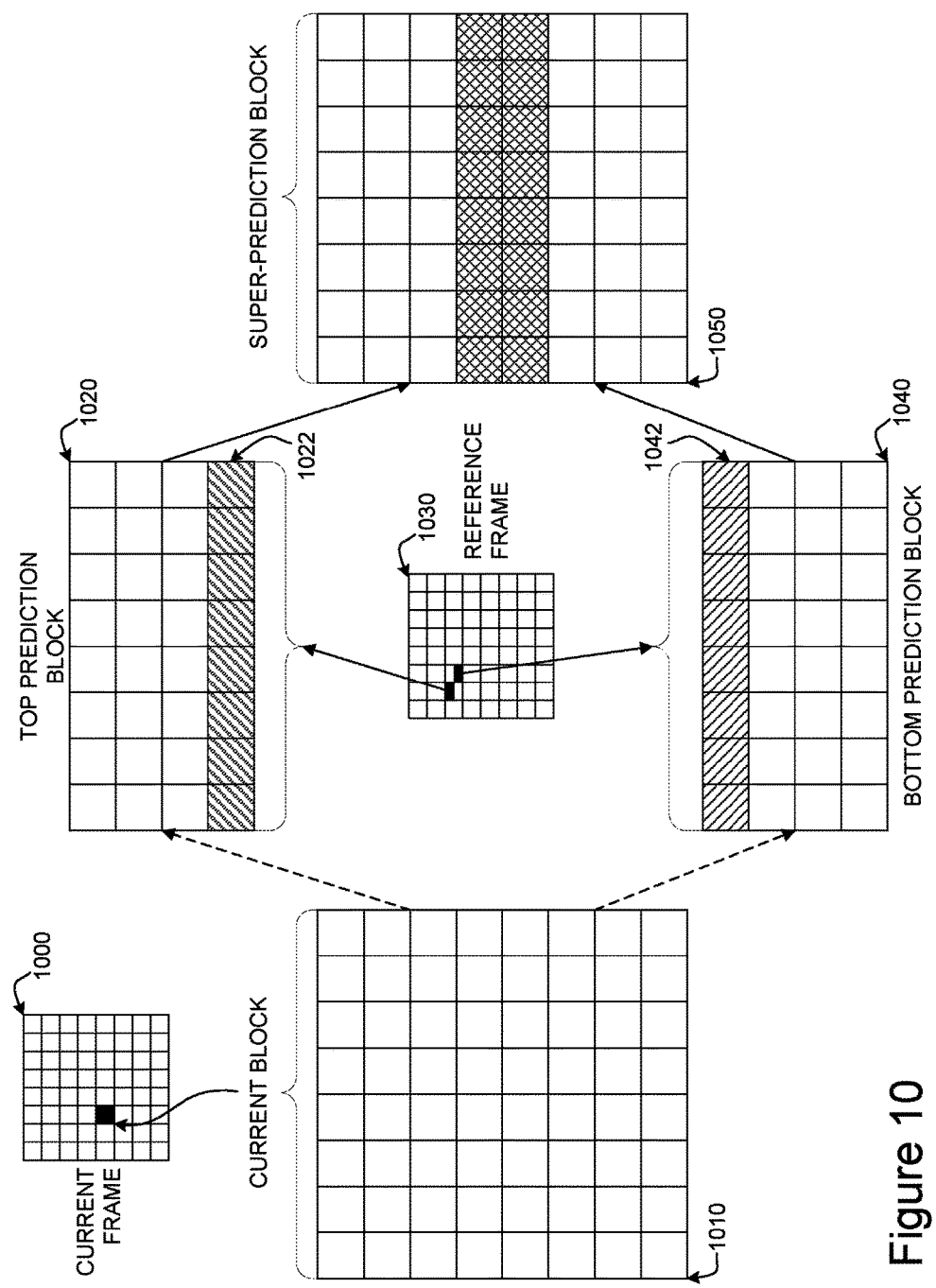
FIG. 10 is a block diagram of super-transform coding including boundary filtering for horizontal partitioning in accordance with implementations of this disclosure.

FIG. 10 is a block diagram of super-transform coding including boundary filtering for horizontal partitioning in accordance with implementations of this disclosure. In some embodiments, super-transform coding, such as the super-transform coding shown in FIG. 8, may include super-prediction coding, such as the super-prediction coding shown in FIG. 9, which may include generating a super-prediction block and including two or more prediction blocks in the super-prediction block, which may include filtering the prediction blocks using boundary filtering as shown at 962 in FIG. 9.

As shown in FIG. 10, a current frame 1000 may include blocks, and super-transform coding may include identifying a current block 1010 from the current frame 1000, as indicated by the black square. For simplicity and clarity the current block 1010 is shown as an 8×8 block, however, any block size, such as a 64×64 block may be used.

The N×N current block 1010 may be horizontally partitioned into a top $$\frac{N}{2} \times N$$

sub-block and a bottom $$\frac{N}{2} \times N$$

sub-block (not shown). A top $$\frac{N}{2} \times N$$

prediction block 1020 corresponding to the top sub-block of the current frame 1010 may be identified. For example, the top prediction block 1020 may be identified from a block, or a portion of a block, from a reference frame 1030, indicated by a motion vector associated with prediction coding the top sub-block of the current frame 1010. A bottom $$\frac{N}{2} \times N$$

prediction block 1040 corresponding to the bottom sub-block of the current frame 1010 may be identified. For example, the bottom prediction block 1040 may be identified from a block, or a portion of a block, from the reference frame 1030, indicated by a motion vector associated with prediction coding the bottom sub-block of the current frame 1010, which may differ from the motion vector associated with prediction coding the top sub-block of the current frame 1010.

In some implementations, the top prediction block 1020 and the bottom prediction block 1040 may be included in a super-prediction block 1050 as a top portion and a bottom portion of the super-prediction block 1050 respectively.

In some implementations, including the top prediction block 1020 and the bottom prediction block 1040 in the super-prediction block 1050 may include filtering one or more pixels from the top prediction block 1020 based on one or more pixels from the bottom prediction block 1040, and filtering one or more pixels from the bottom prediction block 1040 based on one or more pixels from the top prediction block 1020. For example, pixels along the bottom row 1022 of the top prediction block 1020 may be filtered based on pixels along the top row 1042 of the bottom prediction block 1040. Although filtering one row of pixels is shown in FIG. 10, any number of pixels, or rows of pixels, may be filtered. In some implementations, the number of pixels, or rows, filtered may be determined based on a defined filtering metric. In some implementations, the defined filtering metric may be associated with the prediction block size. For example, a 4×4 prediction block may be associated with a defined filtering metric of 1, which may indicate that one row of a 4×4 prediction block may be filtered based on one row of an adjacent 4×4 prediction block; and a 8×8 prediction block may be associated with a defined filtering metric of 2, which may indicate that two rows of an 8×8 prediction block may be filtered based on two rows of an adjacent 8×8 prediction block.

In some implementations, filtering a portion of a prediction block based on a portion of an adjacent prediction block may include using spatially weighted filtering, which may include weighting the contribution of a pixel from a prediction block to a corresponding pixel in the super-prediction block based on the relative spatial distance between the pixels. For example, the value of the pixel in the fourth row and first column of the super-prediction block 1050 may be determined by filtering the pixel in the fourth row 1022 and first column of the top prediction block 1020 based on the pixel in the first row 1042 and first column of the bottom prediction block 1040. The pixel in the fourth row 1022 and first column of the top prediction block 1020 may be spatially concurrent with the pixel in the fourth row and first column of the super-prediction block 1050, and may be given a relatively high weight. The pixel in the first row 1042 and first column of the bottom prediction block 1040 may be spatially adjacent to the pixel in the fourth row and first column of the super-prediction block 1050, and may be given a lower weight relative to the weight of the pixel in the fourth row 1022 and first column of the top prediction block 1020. In some implementations, the filtering may include using a deblocking filter.

Figure 11:
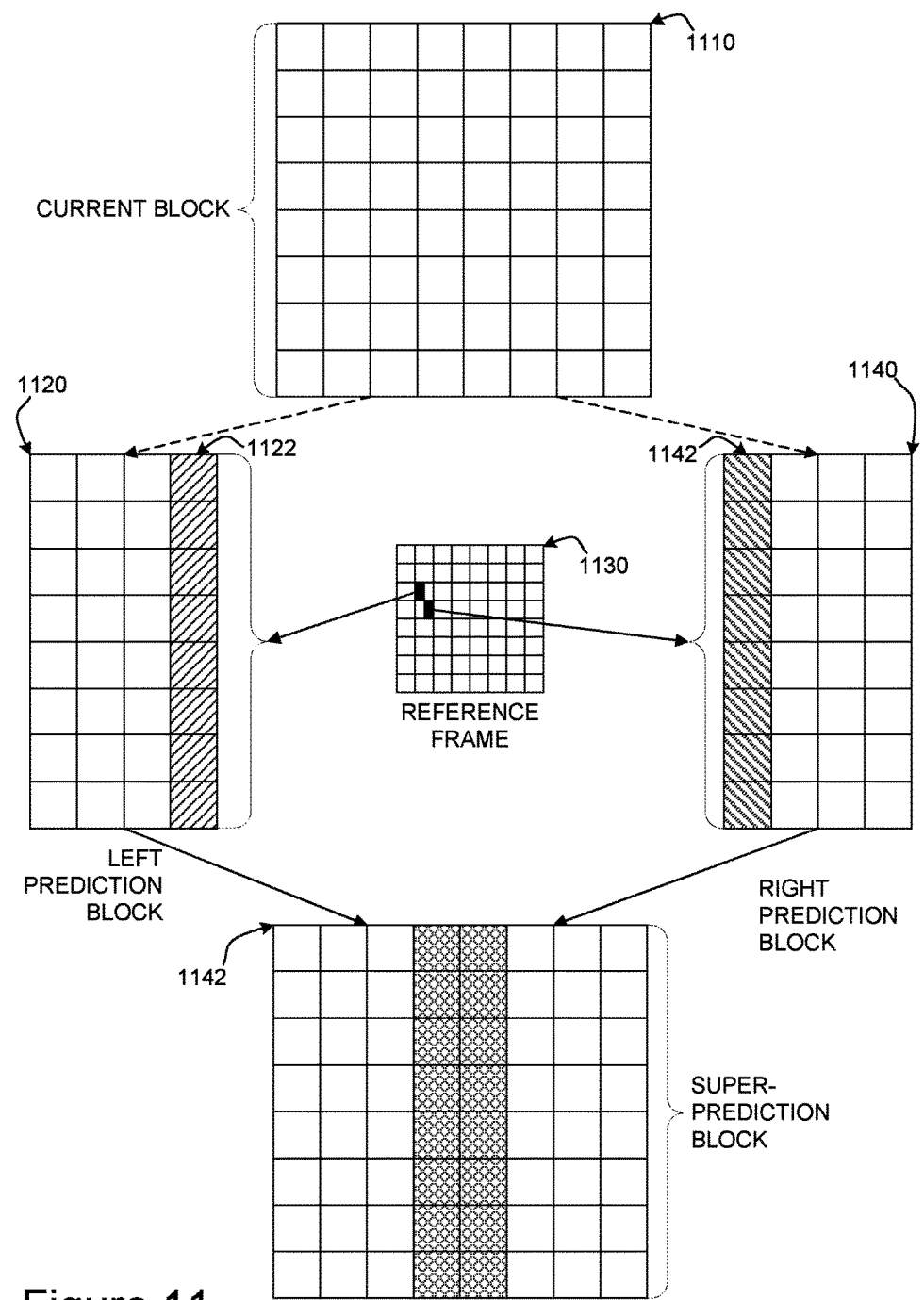
FIG. 11 is a block diagram of super-transform coding including boundary filtering for vertical partitioning in accordance with implementations of this disclosure.

FIG. 11 is a block diagram of super-transform coding including boundary filtering for vertical partitioning in accordance with implementations of this disclosure. In some embodiments, super-transform coding, such as the super-transform coding shown in FIG. 8, may include super-prediction coding, such as the super-prediction coding shown in FIG. 9, which may include generating a super-prediction block and including two or more prediction blocks in the super-prediction block, which may include filtering the prediction blocks using boundary filtering as shown at 962 in FIG. 9.

As shown in FIG. 11, a current frame (not shown) may include blocks, and super-transform coding may include identifying a current block 1110 from the current frame. For simplicity and clarity the current block 1110 is shown as an 8×8 block, however any block size, such as a 64×64 block may be used.

The N×N current block 1110 may be horizontally partitioned into a left $$N \times \frac{N}{2}$$

sub-block and a right $$N \times \frac{N}{2}$$

sub-block (not shown). A left $$N \times \frac{N}{2}$$

prediction block 1120 corresponding to the left sub-block of the current frame 1110 may be identified. For example, the left prediction block 1120 may be identified from a block, or a portion of a block, from a reference frame 1130, indicated by a motion vector associated with prediction coding the left sub-block of the current frame 1110. A right $$N \times \frac{N}{2}$$

prediction block 1140 corresponding to the right sub-block of the current frame 1110 may be identified. For example, the right prediction block 1140 may be identified from a block, or a portion of a block, from the reference frame 1130, indicated by a motion vector associated with prediction coding the right sub-block of the current frame 1110, which may differ from the motion vector associated with prediction coding the left sub-block of the current frame 1110.

In some implementations, the left prediction block 1120 and the right prediction block 1140 may be included in a super-prediction block 1150 as a left portion and a right portion of the super-prediction block 1150 respectively.

In some implementations, including the left prediction block 1120 and the right prediction block 1140 in the super-prediction block 1150 may include filtering one or more pixels from the left prediction block 1120 based on one or more pixels from the right prediction block 1140, and filtering one or more pixels from the right prediction block 1140 based on one or more pixels from the left prediction block 1120. For example, pixels along the right row 1122 of the left prediction block 1120 may be filtered based on pixels along the left row 1142 of the right prediction block 1140. Although filtering one row of pixels is shown in FIG. 11, any number of pixels, or rows of pixels, may be filtered. In some implementations, the number of pixels, or rows, filtered may be determined based on a defined filtering metric. In some implementations, the defined filtering metric may be associated with the prediction block size. For example, a 4×4 prediction block may be associated with a defined filtering metric of 1, which may indicate that one row of a 4×4 prediction block may be filtered based on one row of an adjacent 4×4 prediction block; and a 8×8 prediction block may be associated with a defined filtering metric of 2, which may indicate that two rows of an 8×8 prediction block may be filtered based on two rows of an adjacent 8×8 prediction block.

In some implementations, filtering a portion of a prediction block based on a portion of an adjacent prediction block may include using spatially weighted filtering, which may include weighting the contribution of a pixel from a prediction block to a corresponding pixel in the super-prediction block based on the relative spatial distance between the pixels. For example, the value of the pixel in the first row and fourth column of the super-prediction block 1150 may be determined by filtering the pixel in the first row and fourth column 1122 of the left prediction block 1120 based on the pixel in the first row and first column 1142 of the right prediction block 1140. The pixel in the first row and fourth column 1122 of the left prediction block 1120 may be spatially concurrent with the pixel in the first row and fourth column of the super-prediction block 1150, and may be given a relatively high weight. The pixel in the first row and first column 1142 of the right prediction block 1140 may be spatially adjacent to the pixel in the first row and fourth column of the super-prediction block 1150, and may be given a lower weight relative to the weight of the pixel in the first row and fourth column 1122 of the left prediction block 1120. In some implementations, the filtering may include using a deblocking filter.

Figure 12:
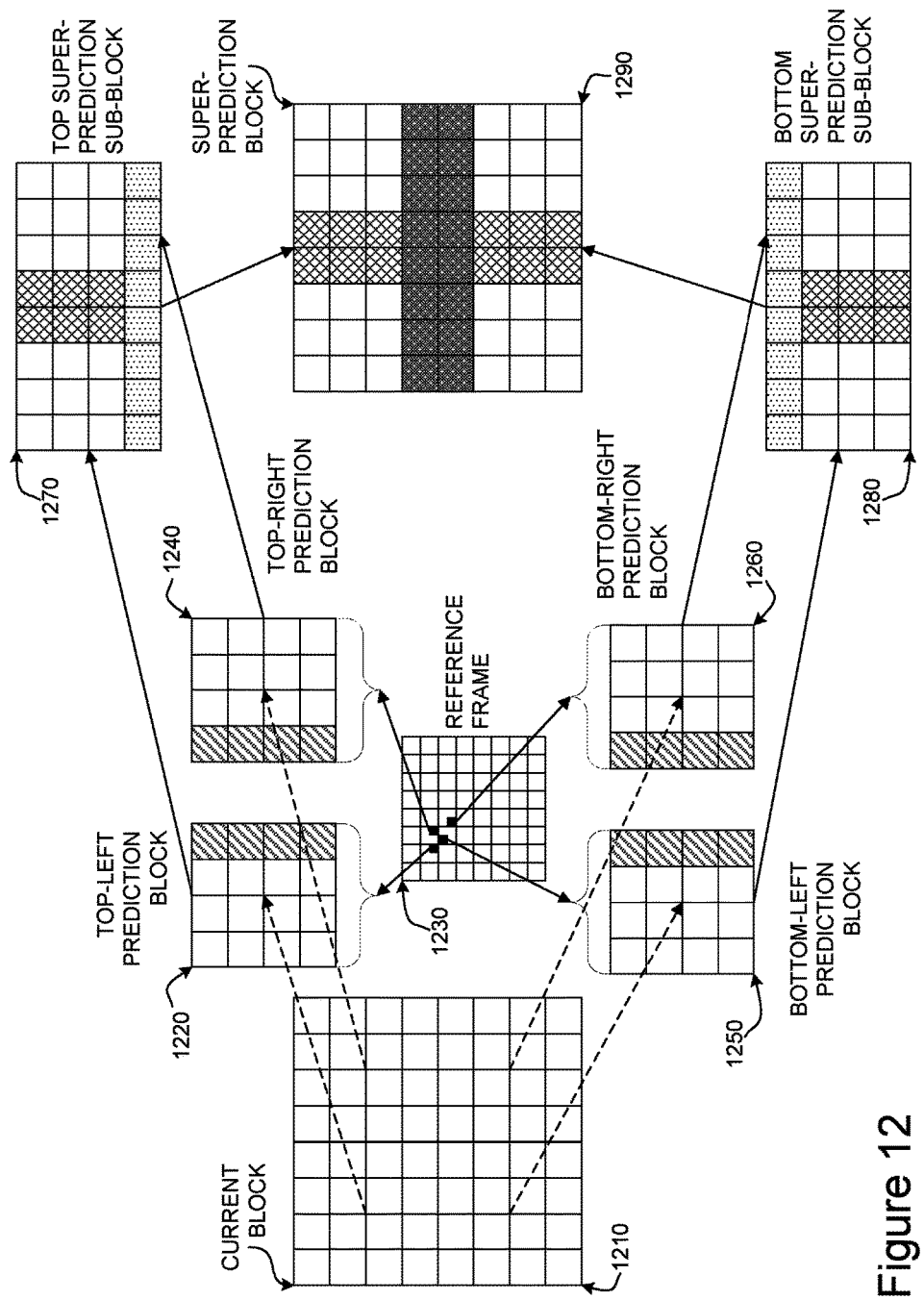
FIG. 12 is a block diagram of super-transform coding including boundary filtering for split partitioning in accordance with implementations of this disclosure.

FIG. 12 is a block diagram of super-transform coding including boundary filtering for split partitioning in accordance with implementations of this disclosure. In some embodiments, super-transform coding, such as the super-transform coding shown in FIG. 8, may include super-prediction coding, such as the super-prediction coding shown in FIG. 9, which may include generating a super-prediction block and including two or more prediction blocks in the super-prediction block, which may include filtering the prediction blocks using boundary filtering as shown at 962 in FIG. 9.

As shown in FIG. 12, a current frame (not shown) may include blocks, and super-transform coding may include identifying a current block 1210 from the current frame. For simplicity and clarity the current block 1210 is shown as an 8×8 block, however any block size, such as a 64×64 block may be used.

The N×N current block 1210 may be split partitioned into a top-left $$\frac{N}{2} \times \frac{N}{2}$$

sub-block, a top-right $$\frac{N}{2} \times \frac{N}{2}$$

sub-block, a bottom-left $$\frac{N}{2} \times \frac{N}{2}$$

sub-block, and a bottom-right $$\frac{N}{2} \times \frac{N}{2}$$

sub-block (not shown). A top-left $$\frac{N}{2} \times \frac{N}{2}$$

prediction block 1220 corresponding to the top-left sub-block of the current frame 1210 may be identified. For example, the top-left prediction block 1220 may be identified from a block, or a portion of a block, from a reference frame 1230, indicated by a motion vector associated with prediction coding the top-left sub-block of the current frame 1210. A top-right $$\frac{N}{2} \times \frac{N}{2}$$

prediction block 1240 corresponding to the top-right sub-block of the current frame 1210 may be identified. For example, the top-right prediction block 1240 may be identified from a block, or a portion of a block, from the reference frame 1230, indicated by a motion vector associated with prediction coding the top-right sub-block of the current frame 1210, which may differ from the respective motion vectors associated with prediction coding other sub-blocks of the current frame 1210. A bottom-left $$\frac{N}{2} \times \frac{N}{2}$$

prediction block 1250 corresponding to the bottom-left sub-block of the current frame 1210 may be identified. For example, the bottom-left prediction block 1250 may be identified from a block, or a portion of a block, from a reference frame 1230, indicated by a motion vector associated with prediction coding the bottom-left sub-block of the current frame 1210. A bottom-right $$\frac{N}{2} \times \frac{N}{2}$$

prediction block 1260 corresponding to the bottom-right sub-block of the current frame 1210 may be identified. For example, the bottom-right prediction block 1260 may be identified from a block, or a portion of a block, from the reference frame 1230, indicated by a motion vector associated with prediction coding the bottom-right sub-block of the current frame 1210, which may differ from the respective motion vectors associated with prediction coding other sub-blocks of the current frame 1210.

In some implementations, the top-left prediction block 1220 and the top-right prediction block 1240 may be included in a top super-prediction sub-block 1270 as a left portion and a right portion of the top super-prediction sub-block 1270 respectively. In some implementations, including the top-left prediction block 1220 and the top-right prediction block 1240 in the top super-prediction sub-block 1270 may include filtering one or more pixels from the top-left prediction block 1220 based on one or more pixels from the top-right prediction block 1240, and filtering one or more pixels from the top-right prediction block 1240 based on one or more pixels from the top-left prediction block 1220. For example, pixels along the right row of the top-left prediction block 1220 may be filtered based on pixels along the left row of the top-right prediction block 1240. Although filtering one row of pixels is shown in FIG. 12, any number of pixels, or rows of pixels, may be filtered. In some implementations, the number of pixels, or rows, filtered may be determined based on a defined filtering metric. In some implementations, the defined filtering metric may be associated with the prediction block size. For example, a 4×4 prediction block may be associated with a defined filtering metric of 1, which may indicate that one row of a 4×4 prediction block may be filtered based on one row of an adjacent 4×4 prediction block; and a 8×8 prediction block may be associated with a defined filtering metric of 2, which may indicate that two rows of an 8×8 prediction block may be filtered based on two rows of an adjacent 8×8 prediction block.

In some implementations, filtering a portion of a prediction block based on a portion of an adjacent prediction block may include using spatially weighted filtering, which may include weighting the contribution of a pixel from a prediction block to a corresponding pixel in the top super-prediction sub-block based on the relative spatial distance between the pixels. For example, the value of the pixel in the first row and fourth column of the top super-prediction sub-block 1270 may be determined by filtering the pixel in the first row and fourth column of the top-left prediction block 1220 based on the pixel in the first row and first column of the top-right prediction block 1240. The pixel in the first row and fourth column of the top-left prediction block 1220 may be spatially concurrent with the pixel in the first row and fourth column of the top super-prediction sub-block 1270, and may be given a relatively high weight. The pixel in the first row and first column of the top-right prediction block 1240 may be spatially adjacent to the pixel in the first row and fourth column of the top super-prediction sub-block 1270, and may be given a lower weight relative to the weight of the pixel in the first row and fourth column of the top-left prediction block 1220. In some implementations, the filtering may include using a deblocking filter.

In some implementations, the bottom-left prediction block 1250 and the bottom-right prediction block 1260 may be included in a bottom super-prediction sub-block 1280 as a left portion and a right portion of the bottom super-prediction sub-block 1280 respectively. In some implementations, including the bottom-left prediction block 1250 and the bottom-right prediction block 1260 in the bottom super-prediction sub-block 1280 may include filtering one or more pixels from the bottom-left prediction block 1250 based on one or more pixels from the bottom-right prediction block 1260, and filtering one or more pixels from the bottom-right prediction block 1260 based on one or more pixels from the bottom-left prediction block 1250. For example, pixels along the right row of the bottom-left prediction block 1250 may be filtered based on pixels along the left row of the bottom-right prediction block 1260. Although filtering one row of pixels is shown in FIG. 12, any number of pixels, or rows of pixels, may be filtered. In some implementations, the number of pixels, or rows, filtered may be determined based on a defined filtering metric. In some implementations, the defined filtering metric may be associated with the prediction block size. For example, a 4×4 prediction block may be associated with a defined filtering metric of 1, which may indicate that one row of a 4×4 prediction block may be filtered based on one row of an adjacent 4×4 prediction block; and a 8×8 prediction block may be associated with a defined filtering metric of 2, which may indicate that two rows of an 8×8 prediction block may be filtered based on two rows of an adjacent 8×8 prediction block.

In some implementations, filtering a portion of a prediction block based on a portion of an adjacent prediction block may include using spatially weighted filtering, which may include weighting the contribution of a pixel from a prediction block to a corresponding pixel in the bottom super-prediction sub-block based on the relative spatial distance between the pixels. For example, the value of the pixel in the first row and fourth column of the bottom super-prediction sub-block 1280 may be determined by filtering the pixel in the first row and fourth column of the bottom-left prediction block 1250 based on the pixel in the first row and first column of the bottom-right prediction block 1260. The pixel in the first row and fourth column of the bottom-left prediction block 1250 may be spatially concurrent with the pixel in the first row and fourth column of the bottom super-prediction sub-block 1280, and may be given a relatively high weight. The pixel in the first row and first column of the bottom-right prediction block 1260 may be spatially adjacent to the pixel in the first row and fourth column of the bottom super-prediction sub-block 1280, and may be given a lower weight relative to the weight of the pixel in the first row and fourth column of the bottom-left prediction block 1250. In some implementations, the filtering may include using a deblocking filter.

In some implementations, the top super-prediction sub-block 1270 and the bottom super-prediction sub-block 1280 may be included in a super-prediction block 1290 as a top portion and a bottom portion of the super-prediction block 1290 respectively. In some implementations, including the top super-prediction sub-block 1270 and the bottom super-prediction sub-block 1280 in the super-prediction block 1290 may include filtering one or more pixels from the top super-prediction sub-block 1270 based on one or more pixels from the bottom super-prediction sub-block 1280, and filtering one or more pixels from the bottom super-prediction sub-block 1280 based on one or more pixels from the top super-prediction sub-block 1270. For example, pixels along the bottom row of the top super-prediction sub-block 1270 may be filtered based on pixels along the top row of the bottom super-prediction sub-block 1280. Although filtering one row of pixels is shown in FIG. 12, any number of pixels, or rows of pixels, may be filtered. In some implementations, the number of pixels, or rows, filtered may be determined based on a defined filtering metric. In some implementations, the defined filtering metric may be associated with the prediction block size. For example, a 4×4 prediction block may be associated with a defined filtering metric of 1, which may indicate that one row of a 4×4 prediction block may be filtered based on one row of an adjacent 4×4 prediction block; and a 8×8 prediction block may be associated with a defined filtering metric of 2, which may indicate that two rows of an 8×8 prediction block may be filtered based on two rows of an adjacent 8×8 prediction block.

In some implementations, filtering a portion of a super-prediction sub-block based on a portion of an adjacent super-prediction sub-block may include using spatially weighted filtering, which may include weighting the contribution of a pixel from a super-prediction sub-block to a corresponding pixel in the super-prediction block based on the relative spatial distance between the pixels. For example, the value of the pixel in the fourth row and first column of the super-prediction block 1290 may be determined by filtering the pixel in the fourth row and first column of the top super-prediction sub-block 12740 based on the pixel in the first row and first column of the bottom super-prediction sub-block 1280. The pixel in the fourth row and first column of the top super-prediction sub-block 1270 may be spatially concurrent with the pixel in the fourth row and first column of the super-prediction block 1290, and may be given a relatively high weight. The pixel in the first row and first column of the bottom super-prediction sub-block 1280 may be spatially adjacent to the pixel in the fourth row and first column of the super-prediction block 1290, and may be given a lower weight relative to the weight of the pixel in the first row and fourth column of the bottom super-prediction sub-block 1280. In some implementations, the filtering may include using a deblocking filter.

Figure 13:
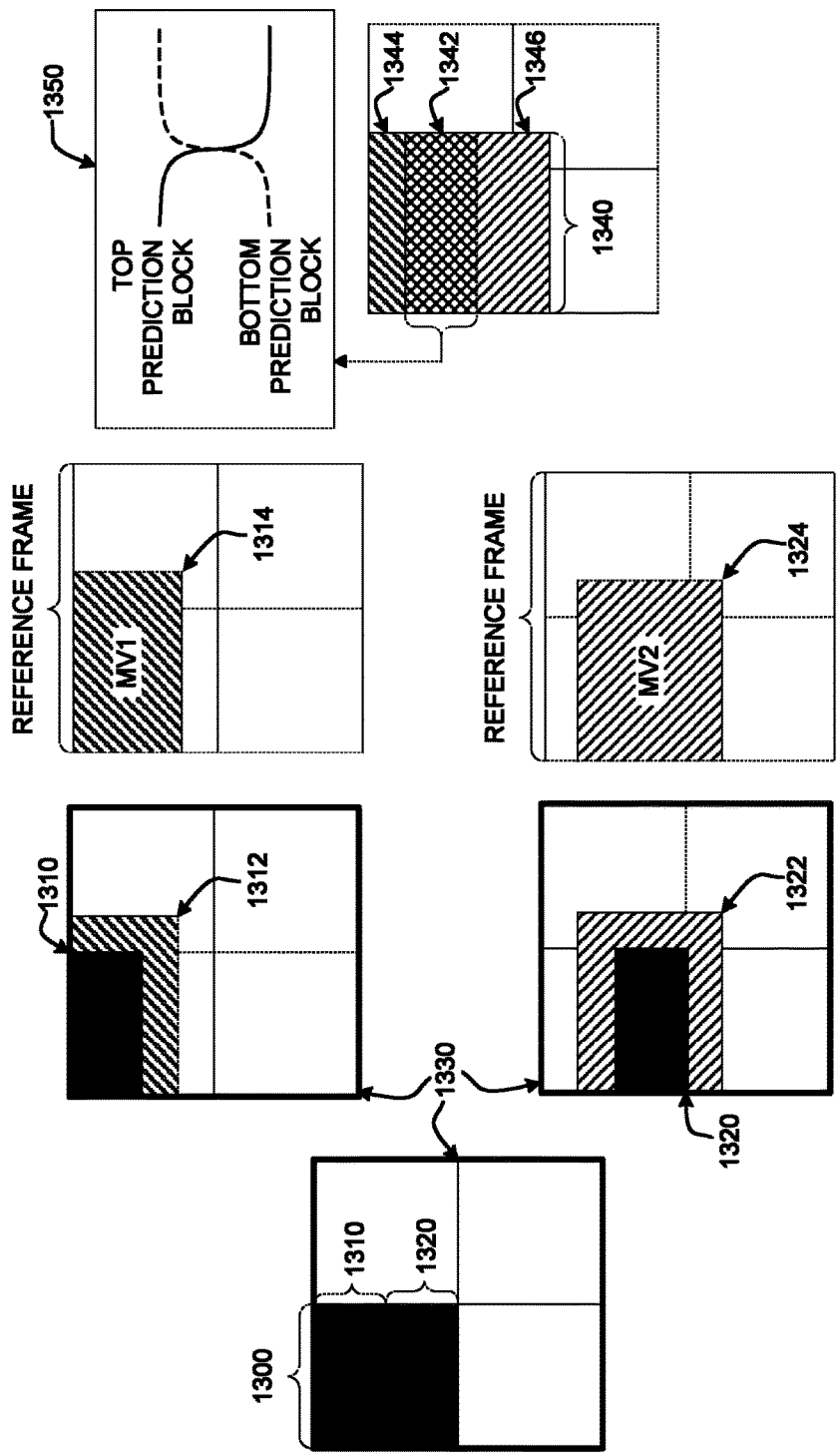
FIG. 13 is a block diagram of super-transform coding including extended prediction filtering for horizontal partitioning in accordance with implementations of this disclosure.

FIG. 13 is a block diagram of super-transform coding including extended prediction filtering for horizontal partitioning in accordance with implementations of this disclosure. In some embodiments, super-transform coding, such as the super-transform coding shown in FIG. 8, may include super-prediction coding, such as the super-prediction coding shown in FIG. 9, which may include generating a super-prediction block and including two or more prediction blocks in the super-prediction block, which may include filtering the prediction blocks, as shown at 962 in FIG. 9, using extended prediction filtering.

As shown in FIG. 13, in some implementations, extended prediction filtering may include identifying a current block 1300. The current block may be horizontally partitioned for prediction coding, which may include identifying a top sub-block, or partition, 1310, associated with a first motion vector (MV1) and a bottom sub-block, or partition, 1320, associated with a second motion vector (MV2). For example, the current block 1300 may be an N×N block, such as a 64×64 block, the top sub-block 1310 may be a $$\frac{N}{2} \times N$$

sub-block, such as a 32×64 sub-block, and the motion vector (MV1) associated with the top sub-block 1310 may indicate a corresponding $$\frac{N}{2} \times N$$

prediction mock size, such as a 32×64 prediction block size. In another example, the current block 1300 may be an N×N block, such as an 64×64 block, the bottom sub-block 1320 may be a $$\frac{N}{2} \times N$$

sub-block, such as a 32×64 sub-block, and the motion vector (MV2) associated with the bottom sub-block 1320 may indicate a corresponding $$\frac{N}{2} \times N$$

prediction block size, such as a 32×64 prediction block size.

In some implementations, extended prediction filtering may include identifying super-prediction extension size. The super-prediction extension size may indicate a number of pixels, such as eight pixels, to extend the prediction block sizes to identify an extended prediction block sizes. In some implementations, the super-prediction extension size may be identified based on the prediction block size, color sampling, or a combination thereof. For simplicity and clarity the super-prediction extension size is described herein as a number or cardinality of pixels, or rows or columns of pixels; however, the number of pixels may depend on color sampling. For example, as shown in FIG. 6, an N×N block may be described as including N×N pixels, which may correspond with a N×N block of luminance pixels, a $$\frac{N}{2} \times \frac{N}{2}$$

block of U or Cb chrominance pixels, and a $$\frac{N}{2} \times \frac{N}{2}$$

block of V or Cr chrominance pixels.

In some implementations, extended prediction filtering may include extending the size of each prediction block to generate corresponding extended prediction block sizes based on the super-prediction extension size and identified super-transform block boundaries. In some implementations, a prediction block size may be extended by the super-prediction extension size above the sub-block, above and to the left of the sub-block, to the left of the sub-block, down and to the left of the sub-block, down from the sub-block, down and to the right of the sub-block, to the right of the sub-block, above and to the right of the sub-block, or a combination thereof. For example, an 8×8 prediction block size may be extended by eight pixels above, eight pixels above and to the right, eight pixels to the right, eight pixels down and to the right, eight pixels down, eight pixels down and to the left, and eight pixels to the left, to generate a 24×24 extended prediction block size. In some implementations, the extended prediction block size may be limited to pixels within a corresponding super-transform boundary.

In an example, the current block 1300 may be the top-left 32×32 sub-block in a 64×64 block and a 64×64 super-transform size 1330 may be identified for super-transform coding the 64×64 block. The current 32×32 block 1300 may be partitioned into a top 16×32 sub-block 1310 and a bottom 16×32 sub-block 1320. The super-prediction extension size may be eight pixels. The prediction block size corresponding to the top 16×32 sub-block 1310 may be extended by 8 pixels to the right and down to determine a 24×40 top extended prediction block size 1312. Extending the prediction block size corresponding to the top 16×32 sub-block 1310 to the left and above may be limited by the super-transform boundaries 1330 as shown. The prediction block size corresponding to the bottom 16×32 sub-block 1320 may be extended by 8 pixels to the right, down, and above to generate a 32×40 bottom extended prediction block size 1322. Extending the prediction block size corresponding to the bottom 16×32 sub-block 1320 to the left may be limited by the super-transform boundaries 1330 as shown.

In another example, the vertical distance between a top-left pixel location in the sub-block and a top-left pixel location in the super-transform may be at least, such as equal to or greater than, the super-prediction extension size, the horizontal distance between the top-left pixel location in the sub-block and the top-left pixel location in the super-transform may be at least the super-prediction extension size, the vertical distance between a bottom-right pixel location in the sub-block and a bottom-right pixel location in the super-transform may be at least the super-prediction extension size, the horizontal distance between the bottom-right pixel location in the sub-block and the bottom-right pixel location in the super-transform may be at least the super-prediction extension size, and the prediction block size may be extended by super-prediction extension size pixel locations above, left, above-left, down, down-left, right, down-right, and above-right.

In another example, the vertical distance between a top-left pixel location in the sub-block and a top-left pixel location in the super-transform may be at least, such as equal to or greater than, the super-prediction extension size, the horizontal distance between the top-left pixel location in the sub-block and the top-left pixel location in the super-transform may be at least the super-prediction extension size, the vertical distance between a bottom-right pixel location in the sub-block and a bottom-right pixel location in the super-transform may be at least the super-prediction extension size, the horizontal distance between the bottom-right pixel location in the sub-block and the bottom-right pixel location in the super-transform may be less than the super-prediction extension size, and the prediction block size may be extended by super-prediction extension size pixel locations above, left, above-left, down-left, and down.

In another example, the vertical distance between a top-left pixel location in the sub-block and a top-left pixel location in the super-transform may be at least, such as equal to or greater than, the super-prediction extension size, the horizontal distance between the top-left pixel location in the sub-block and the top-left pixel location in the super-transform may be at least the super-prediction extension size, the vertical distance between a bottom-right pixel location in the sub-block and a bottom-right pixel location in the super-transform may be at least the super-prediction extension size, the vertical distance between the bottom-right pixel location in the sub-block and the bottom-right pixel location in the super-transform may be less than the super-prediction extension size, the horizontal distance between the bottom-right pixel location in the sub-block and the bottom-right pixel location in the super-transform may be at least the super-prediction extension size, and the prediction block size may be extended by super-prediction extension size pixel locations above, left, above-left, above-right, and right.

In another example, the vertical distance between a top-left pixel location in the sub-block and a top-left pixel location in the super-transform may be at least, such as equal to or greater than, the super-prediction extension size, the horizontal distance between the top-left pixel location in the sub-block and the top-left pixel location in the super-transform may be at least the super-prediction extension size, the vertical distance between a bottom-right pixel location in the sub-block and a bottom-right pixel location in the super-transform may be at least the super-prediction extension size, the vertical distance between the bottom-right pixel location in the sub-block and the bottom-right pixel location in the super-transform may be less than the super-prediction extension size, the horizontal distance between the bottom-right pixel location in the sub-block and the bottom-right pixel location in the super-transform may be less than the super-prediction extension size, and the prediction block size may be extended by super-prediction extension size pixel locations above, above-left, and left.

In another example, the vertical distance between a top-left pixel location in the sub-block and a top-left pixel location in the super-transform may be at least, such as equal to or greater than, the super-prediction extension size, the horizontal distance between the top-left pixel location in the sub-block and the top-left pixel location in the super-transform may be less than the super-prediction extension size, the vertical distance between the bottom-right pixel location in the sub-block and the bottom-right pixel location in the super-transform may be at least the super-prediction extension size, the horizontal distance between the bottom-right pixel location in the sub-block and the bottom-right pixel location in the super-transform may be at least the super-prediction extension size, and the prediction block size may be extended by super-prediction extension size pixel locations above, down, above-right, down-right, and right.

In another example, the vertical distance between a top-left pixel location in the sub-block and a top-left pixel location in the super-transform may be at least, such as equal to or greater than, the super-prediction extension size, the horizontal distance between the top-left pixel location in the sub-block and the top-left pixel location in the super-transform may be less than the super-prediction extension size, the vertical distance between the bottom-right pixel location in the sub-block and the bottom-right pixel location in the super-transform may be at least the super-prediction extension size, the horizontal distance between the bottom-right pixel location in the sub-block and the bottom-right pixel location in the super-transform may be less than the super-prediction extension size, and the prediction block size may be extended by super-prediction extension size pixel locations above and down.

In another example, the vertical distance between a top-left pixel location in the sub-block and a top-left pixel location in the super-transform may be at least, such as equal to or greater than, the super-prediction extension size, the horizontal distance between the top-left pixel location in the sub-block and the top-left pixel location in the super-transform may be less than the super-prediction extension size, the vertical distance between the bottom-right pixel location in the sub-block and the bottom-right pixel location in the super-transform may be less than the super-prediction extension size, the horizontal distance between the bottom-right pixel location in the sub-block and the bottom-right pixel location in the super-transform may be at least the super-prediction extension size, and the prediction block size may be extended by super-prediction extension size pixel locations above, above-right, and right.

In another example, the vertical distance between a top-left pixel location in the sub-block and a top-left pixel location in the super-transform may be at least, such as equal to or greater than, the super-prediction extension size, the horizontal distance between the top-left pixel location in the sub-block and the top-left pixel location in the super-transform may be less than the super-prediction extension size, the vertical distance between the bottom-right pixel location in the sub-block and the bottom-right pixel location in the super-transform may be less than the super-prediction extension size, the horizontal distance between the bottom-right pixel location in the sub-block and the bottom-right pixel location in the super-transform may be less than the super-prediction extension size, and the prediction block size may be extended by super-prediction extension size pixel locations above.

In another example, the vertical distance between the top-left pixel location in the sub-block and the top-left pixel location in the super-transform may be less than the super-prediction extension size, the horizontal distance between the top-left pixel location in the sub-block and the top-left pixel location in the super-transform may be at least the super-prediction extension size, the vertical distance between the bottom-right pixel location in the sub-block and the bottom-right pixel location in the super-transform may be at least the super-prediction extension size, the horizontal distance between the bottom-right pixel location in the sub-block and the bottom-right pixel location in the super-transform may be at least the super-prediction extension size, and the prediction block size may be extended by super-prediction extension size pixel locations left, down, down-left, down-right, and right.

In another example, the vertical distance between the top-left pixel location in the sub-block and the top-left pixel location in the super-transform may be less than the super-prediction extension size, the horizontal distance between the top-left pixel location in the sub-block and the top-left pixel location in the super-transform may be at least the super-prediction extension size, the vertical distance between the bottom-right pixel location in the sub-block and the bottom-right pixel location in the super-transform may be at least the super-prediction extension size, the horizontal distance between the bottom-right pixel location in the sub-block and the bottom-right pixel location in the super-transform may be less than the super-prediction extension size, and the prediction block size may be extended by super-prediction extension size pixel locations left, down-left, and down.

In another example, the vertical distance between the top-left pixel location in the sub-block and the top-left pixel location in the super-transform may be less than the super-prediction extension size, the horizontal distance between the top-left pixel location in the sub-block and the top-left pixel location in the super-transform may be at least the super-prediction extension size, the vertical distance between the bottom-right pixel location in the sub-block and the bottom-right pixel location in the super-transform may be less than the super-prediction extension size, the horizontal distance between the bottom-right pixel location in the sub-block and the bottom-right pixel location in the super-transform may be at least the super-prediction extension size, and the prediction block size may be extended by super-prediction extension size pixel locations left and right.

In another example, the vertical distance between the top-left pixel location in the sub-block and the top-left pixel location in the super-transform may be less than the super-prediction extension size, the horizontal distance between the top-left pixel location in the sub-block and the top-left pixel location in the super-transform may be at least the super-prediction extension size, the vertical distance between the bottom-right pixel location in the sub-block and the bottom-right pixel location in the super-transform may be less than the super-prediction extension size, the horizontal distance between the bottom-right pixel location in the sub-block and the bottom-right pixel location in the super-transform may be less than the super-prediction extension size, and the prediction block size may be extended by super-prediction extension size pixel locations left.

In another example, the vertical distance between the top-left pixel location in the sub-block and the top-left pixel location in the super-transform may be less than the super-prediction extension size, the horizontal distance between the top-left pixel location in the sub-block and the top-left pixel location in the super-transform may be less than the super-prediction extension size, the vertical distance between the bottom-right pixel location in the sub-block and the bottom-right pixel location in the super-transform may be at least the super-prediction extension size, the horizontal distance between the bottom-right pixel location in the sub-block and the bottom-right pixel location in the super-transform may be at least the super-prediction extension size, and the prediction block size may be extended by super-prediction extension size pixel locations down, down-right and right.

In another example, the vertical distance between the top-left pixel location in the sub-block and the top-left pixel location in the super-transform may be less than the super-prediction extension size, the horizontal distance between the top-left pixel location in the sub-block and the top-left pixel location in the super-transform may be less than the super-prediction extension size, the vertical distance between the bottom-right pixel location in the sub-block and the bottom-right pixel location in the super-transform may be at least the super-prediction extension size, the horizontal distance between the bottom-right pixel location in the sub-block and the bottom-right pixel location in the super-transform may be less than the super-prediction extension size, and the prediction block size may be extended by super-prediction extension size pixel locations down.

In another example, the vertical distance between the top-left pixel location in the sub-block and the top-left pixel location in the super-transform may be less than the super-prediction extension size, the horizontal distance between the top-left pixel location in the sub-block and the top-left pixel location in the super-transform may be less than the super-prediction extension size, the vertical distance between the bottom-right pixel location in the sub-block and the bottom-right pixel location in the super-transform may be less than the super-prediction extension size, the horizontal distance between the bottom-right pixel location in the sub-block and the bottom-right pixel location in the super-transform may be at least the super-prediction extension size, and the prediction block size may be extended by super-prediction extension size pixel locations right.

In some implementations, extending the prediction block may include extending the prediction block from the sub-block size to the current block size and extending the prediction block from the current block size by the super-prediction extension size. For example, the current block may be an 8×8 block, the super-transform size may be greater than 8×8, and extending the prediction block size may include extending the prediction block size from the sub-block size, which may be, for example, 4×8, 8×4, or 4×4, to the current block size, 8×8, and extending the 8×8 prediction block, within the super-transform, by the super-prediction extension size to generate, for example, a 24×24 prediction block.

In some implementations, a prediction block corresponding to each sub-block of the current block may be identified based on the motion vector identified for predicting the sub-block and the corresponding extended prediction block size. For example, the top prediction block 1314 may be identified from a reference frame based on the motion vector (MV1) associated with predicting the top sub-block 1310 and the identified extended prediction block size 1312 for the top sub-block 1310. In another example, the bottom prediction block 1324 may be identified from a reference frame based on the motion vector (MV2) associated with predicting the bottom sub-block 1310 and the identified extended prediction block size 1322 for the bottom sub-block 1320.

In some implementations, a super-prediction block 1340 for the current block 1300 may be determined by spatially combining the identified prediction blocks 1314/1324 for the partitions 1310/1320 of the current block 1300 with weighted averaging. In some implementations, each pixel in the super-prediction block 1340 may include an averaged weighted contribution from spatially corresponding, or collocated, pixels from one or more of the prediction blocks 1314/1324.

In some implementations, each pixel in the identified prediction blocks 1314/1324 may represent a predicted value of a pixel at a location in the portion of the current video frame concurrent with the super-transform. In some implementations, the identified prediction blocks 1314/1324 may include multiple collocated, or spatially concurrent, pixels. For example, a pixel located near the bottom edge of the top prediction block 1314 may be spatially concurrent with a pixel in the bottom prediction block 1324. In some implementations, a weighted value may be identified for each collocated pixel and an average of each weighted collocated pixel value may be included in the super-prediction block 1340 at the corresponding location, as indicated by the center portion 1342 of the super-prediction block 1340.

In some implementations, one or more pixels from a prediction block 1314/1324 may be omitted from the other prediction block, weighted averaging may be omitted for the pixel, and the pixel value from the prediction block may be included in the super-prediction block 1340. For example, a pixel corresponding to a pixel location near the top of the top prediction block 1314 may be omitted from the bottom prediction block 1324, and the value of the corresponding pixel in the top prediction block 1314 may be included at the corresponding location in the super-prediction block 1340, as indicated by the top portion 1344 of the super-prediction block 1340. In another example, a pixel corresponding to a pixel location near the bottom of the bottom prediction block 1324 may be omitted from the top prediction block 1314, and the value of the corresponding pixel in the bottom prediction block 1324 may be included at the corresponding location in the super-prediction block 1340, as indicated by the bottom portion 1346 of the super-prediction block 1340.

In some implementations, a weighted value for each collocated pixel from the prediction blocks 1314/1324 may be determined based on the number, or cardinality, of collocated pixels, the relative spatial distance of the collocated pixel from the border between the sub-block corresponding to the prediction block and an adjacent prediction block, or a combination thereof, as indicated at 1350.

Figure 14:
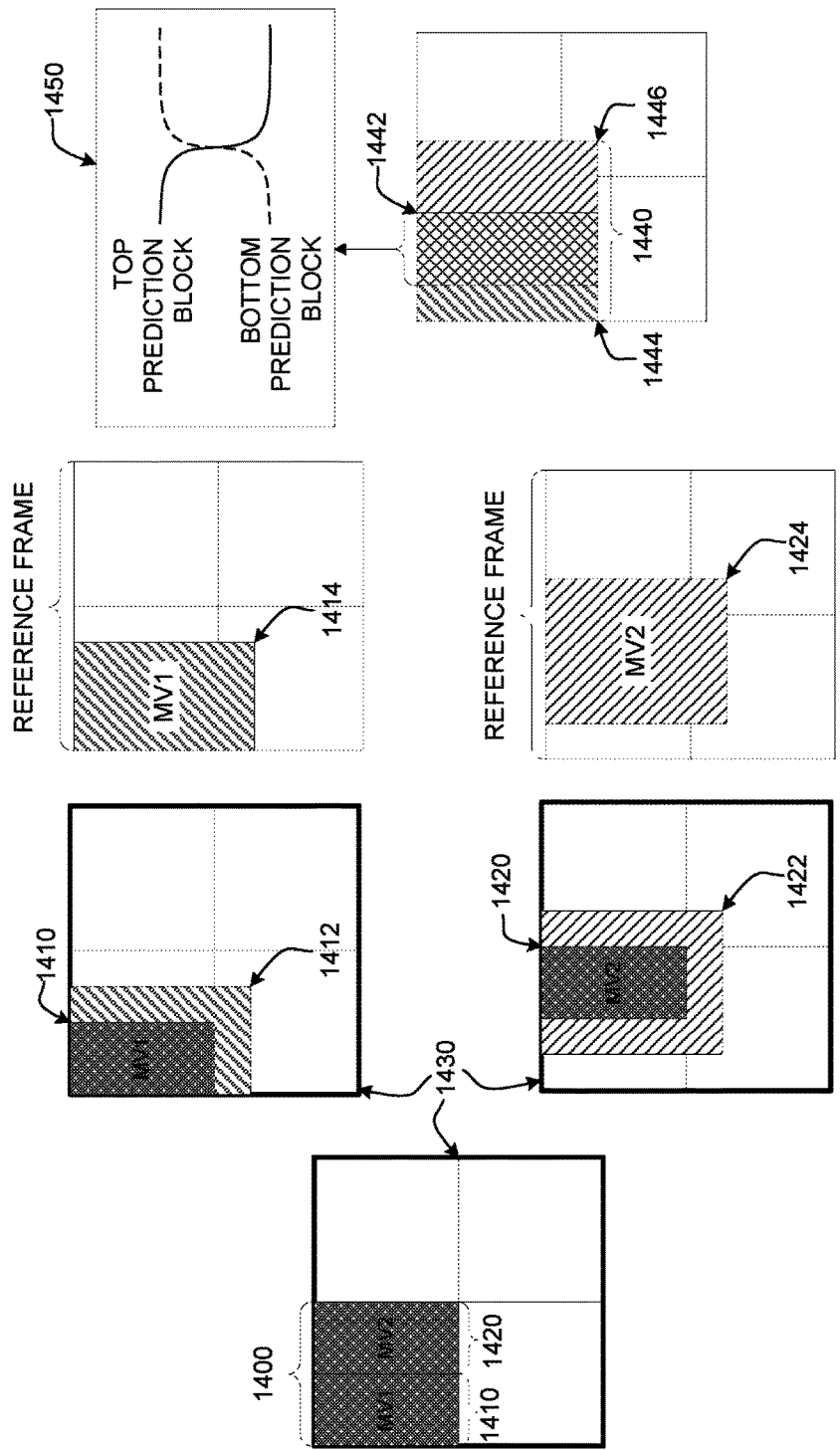
FIG. 14 is a block diagram of super-transform coding including extended prediction filtering for vertical partitioning in accordance with implementations of this disclosure.

FIG. 14 is a block diagram of super-transform coding including extended prediction filtering for vertical partitioning in accordance with implementations of this disclosure. Super-transform coding including extended prediction filtering for vertical partitioning as shown in FIG. 14 may be similar to the super-transform coding including extended prediction filtering for horizontal partitioning shown in FIG. 13, except as described herein.

As shown in FIG. 14, in some implementations, extended prediction filtering may include identifying a current block 1400. The current block may be vertically partitioned for prediction coding, which may include identifying a left sub-block, or partition, 1410, associated with a first motion vector (MV1) and a right sub-block, or partition, 1420, associated with a second motion vector (MV2). For example, the current block 1400 may be an N×N block, such as a 64×64 block, the left sub-block 1410 may be a $$N \times \frac{N}{2}$$

sub-block, such as a 64×32 sub-block, and the motion vector (MV1) associated with the left sub-block 1410 may indicate a corresponding $$N \times \frac{N}{2}$$

prediction block size, such as a 64×32 prediction block size. In another example, the current block 1400 may be an N×N block, such as an 64×64 block, the right sub-block 1420 may be a $$N \times \frac{N}{2}$$

sub-block, such as a 64×32 sub-block, and the motion vector (MV2) associated with the right sub-block 1420 may indicate a corresponding $$N \times \frac{N}{2}$$

prediction block size, such as a 64×32 prediction block size.

In an example, the current block 1400 may be the top-left 32×32 sub-block in a 64×64 block and a 64×64 super-transform size 1430 may be identified for super-transform coding the 64×64 block. The current 32×32 block 1400 may be partitioned into a left 32×16 sub-block 1410 and a right 32×16 sub-block 1420. The super-prediction extension size may be eight pixels. The prediction block size corresponding to the left 32×16 sub-block 1410 may be extended by 8 pixels to the right and down to determine a 40×24 left extended prediction block size 1412. Extending the prediction block size corresponding to the left 32×16 sub-block 1410 to the left and above may be limited by the super-transform boundaries 1430 as shown. The prediction block size corresponding to the right 32×16 sub-block 1420 may be extended by 8 pixels to the right, down, and left to generate a 40×32 right extended prediction block size 1422. Extending the prediction block size corresponding to the right 32×16 sub-block 1420 above may be limited by the super-transform boundaries 1430 as shown.

In some implementations, extending the prediction block may include extending the prediction block from the sub-block size to the current block size and extending the prediction block from the current block size by the super-prediction extension size. For example, the current block may be an 8×8 block, the super-transform size may be greater than 8×8, and extending the prediction block size may include extending the prediction block size from the sub-block size, which may be, for example, 4×8, 8×4, or 4×4, to the current block size, 8×8, and extending the 8×8 prediction block, within the super-transform, by the super-prediction extension size to generate, for example, a 24×24 prediction block.

In some implementations, a prediction block corresponding to each sub-block of the current block may be identified based on the motion vector identified for predicting the sub-block and the corresponding extended prediction block size. For example, the left prediction block 1414 may be identified from a reference frame based on the motion vector (MV1) associated with predicting the left sub-block 1410 and the identified extended prediction block size 1412 for the left sub-block 1410. In another example, the right prediction block 1424 may be identified from a reference frame based on the motion vector (MV2) associated with predicting the right sub-block 1410 and the identified extended prediction block size 1422 for the right sub-block 1420.

In some implementations, a super-prediction block 1440 for the current block 1400 may be determined by spatially combining the identified prediction blocks 1414/1424 for the partitions 1410/1420 of the current block 1400 with weighted averaging. In some implementations, each pixel in the super-prediction block 1440 may include an averaged weighted contribution from spatially corresponding, or collocated, pixels from one or more of the prediction blocks 1414/1424.

In some implementations, each pixel in the identified prediction blocks 1414/1424 may represent a predicted value of a pixel at a location in the portion of the current video frame concurrent with the super-transform. In some implementations, the identified prediction blocks 1414/1424 may include multiple collocated, or spatially concurrent, pixels. For example, a pixel located near the right edge of the left prediction block 1414 may be spatially concurrent with a pixel in the right prediction block 1424. In some implementations, a weighted value may be identified for each collocated pixel and an average of each weighted collocated pixel value may be included in the super-prediction block 1440 at the corresponding location, as indicated by the center portion 1442 of the super-prediction block 1440.

In some implementations, one or more pixels from a prediction block 1414/1424 may be omitted from the other prediction block, weighted averaging may be omitted for the pixel, and the pixel value from the prediction block may be included in the super-prediction block 1440. For example, a pixel corresponding to a pixel location near the left edge of the left prediction block 1414 may be omitted from the right prediction block 1424, and the value of the corresponding pixel in the left prediction block 1414 may be included at the corresponding location in the super-prediction block 1440, as indicated by the left portion 1444 of the super-prediction block 1440. In another example, a pixel corresponding to a pixel location near the right edge of the right prediction block 1424 may be omitted from the left prediction block 1414, and the value of the corresponding pixel in the right prediction block 1424 may be included at the corresponding location in the super-prediction block 1440, as indicated by the right portion 1446 of the super-prediction block 1440.

In some implementations, a weighted value for each collocated pixel from the prediction blocks 1414/1424 may be determined based on the number, or cardinality, of collocated pixels, the relative spatial distance of the collocated pixel from the border between the sub-block corresponding to the prediction block and an adjacent prediction block, or a combination thereof, as indicated at 1450.

Figure 15:
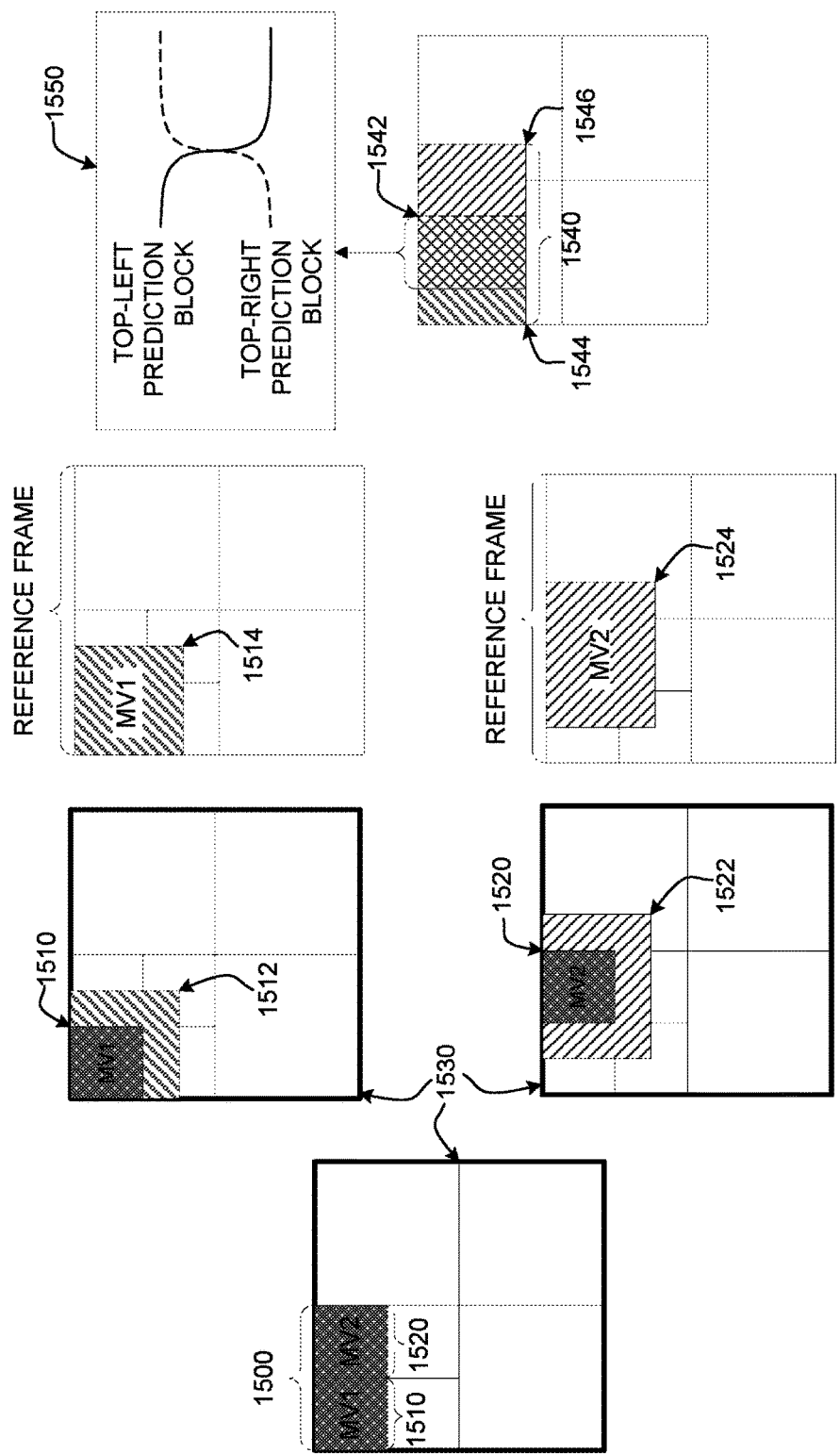
FIGS. 15-17 are block diagrams of super-transform coding including extended prediction filtering for split partitioning in accordance with implementations of this disclosure.
Figure 16:
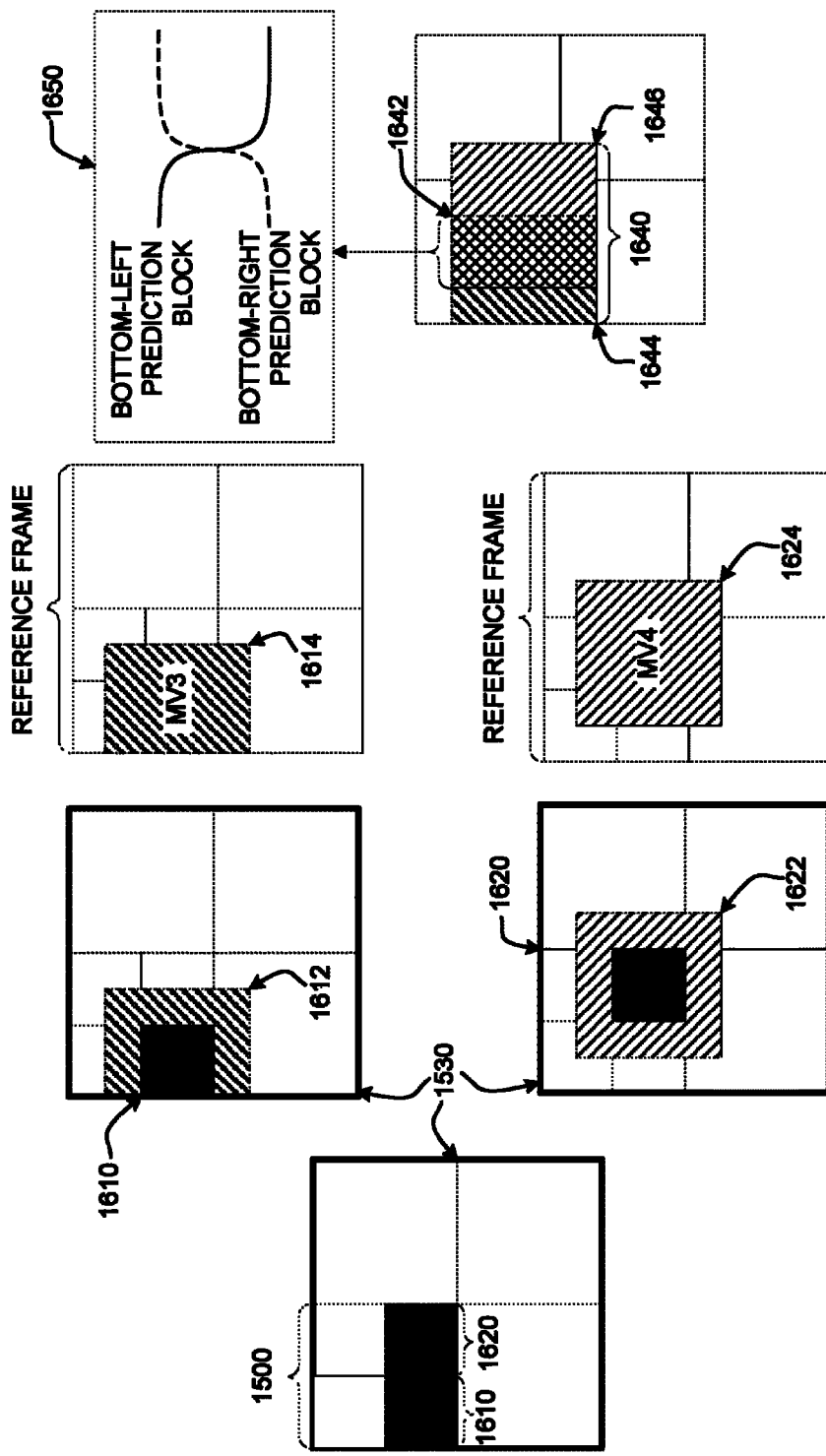
Figure 17:
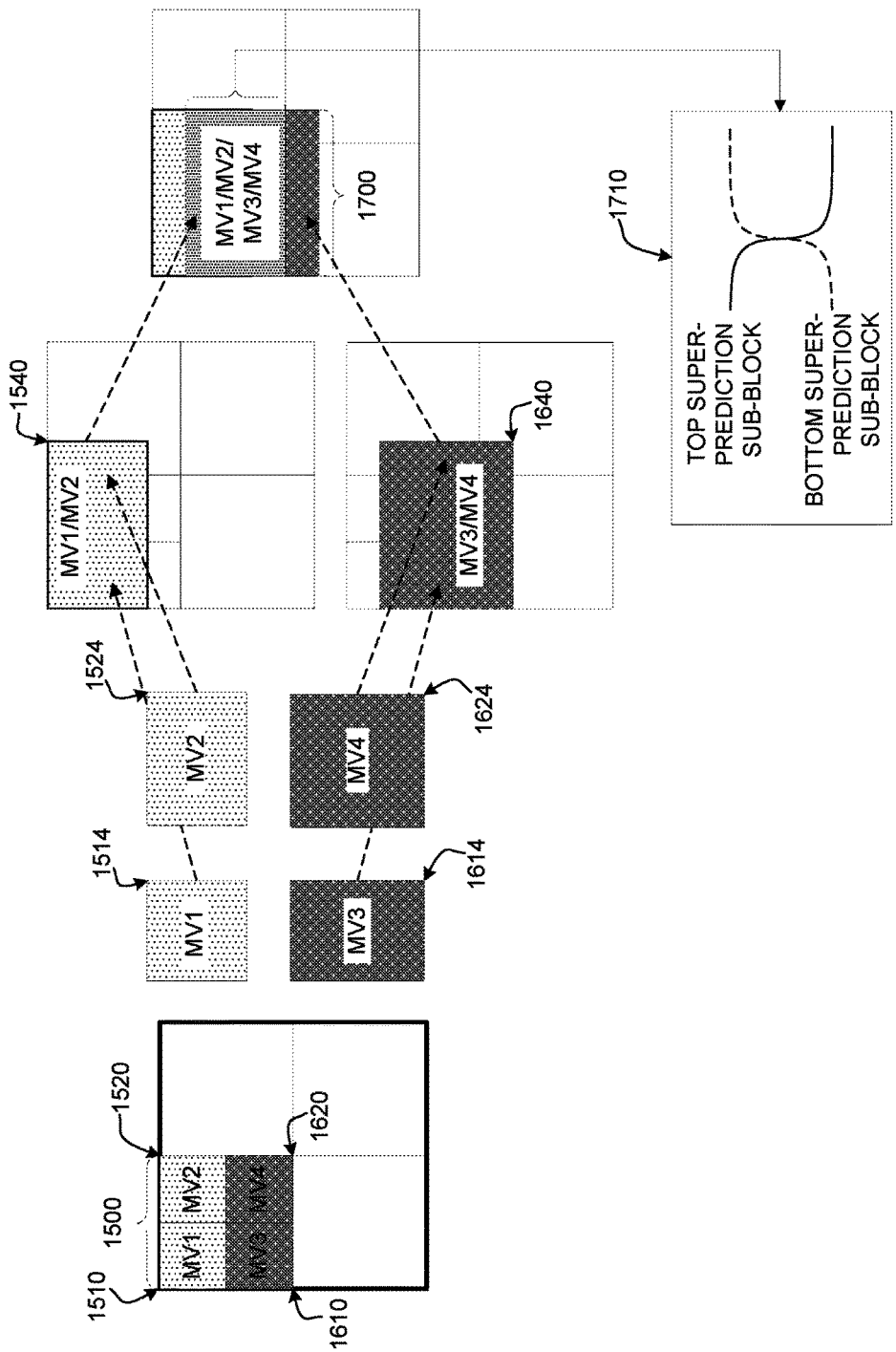

FIGS. 15-17 are block diagrams of super-transform coding including extended prediction filtering for split partitioning in accordance with implementations of this disclosure. Split partitioning for the top-left and top-right partitions are shown in FIG. 15. Super-transform coding including extended prediction filtering for vertical partitioning as shown in FIGS. 15-17 may be similar to the super-transform coding including extended prediction filtering for horizontal partitioning shown in FIGS. 13-14, except as described herein.

As shown in FIG. 15, in some implementations, extended prediction filtering may include identifying a current block 1500. The current block may be split partitioned for prediction coding, which may include identifying a top-left sub-block, or partition, 1510, associated with a first motion vector (MV1) and a top-right sub-block, or partition, 1520, associated with a second motion vector (MV2). For example, the current block 1500 may be an N×N block, such as a 64×64 block, the top-left sub-block 1510 may be a $$\frac{N}{2} \times \frac{N}{2}$$

sub-block, such as a 32×32 sub-block, and the motion vector (MV1) associated with the top-left sub-block 1510 may indicate a corresponding $$\frac{N}{2} \times \frac{N}{2}$$

prediction block size, such as a 32×32 prediction block size. In another example, the current block 1500 may be an N×N block, such as an 64×64 block, the top-right sub-block 1520 may be a $$\frac{N}{2} \times \frac{N}{2}$$

sub-block, such as a 32×32 sub-block, and the motion vector (MV2) associated with the top-right sub-block 1520 may indicate a corresponding $$\frac{N}{2} \times \frac{N}{2}$$

prediction block size, such as a 32×32 prediction block size.

In another example, the current block 1500 may be the top-left 32×32 sub-block in a 64×64 block and a 64×64 super-transform size 1530 may be identified for super-transform coding the 64×64 block. The current 32×32 block 1500 may be partitioned into a top-left 16×16 sub-block 1510 and a top-right 16×16 sub-block 1520. The super-prediction extension size may be eight pixels. The prediction block size corresponding to the top-left 16×16 sub-block 1510 may be extended by 8 pixels to the right and down to determine a 24×24 top-left extended prediction block size 1512. Extending the prediction block size corresponding to the top-left 16×16 sub-block 1510 to the left and above may be limited by the super-transform boundaries 1530 as shown. The prediction block size corresponding to the top-right 16×16 sub-block 1520 may be extended by 8 pixels to the right, down, and left to generate a 24×32 top-right extended prediction block size 1522. Extending the prediction block size corresponding to the top-right 16×16 sub-block 1520 above may be limited by the super-transform boundaries 1530 as shown.

In some implementations, extending the prediction block may include extending the prediction block from the sub-block size to the current block size and extending the prediction block from the current block size by the super-prediction extension size. For example, the current block may be an 8×8 block, the super-transform size may be greater than 8×8, and extending the prediction block size may include extending the prediction block size from the sub-block size, which may be, for example, 4×8, 8×4, or 4×4, to the current block size, 8×8, and extending the 8×8 prediction block, within the super-transform, by the super-prediction extension size to generate, for example, a 24×24 prediction block.

In some implementations, a prediction block corresponding to each sub-block of the current block may be identified based on the motion vector identified for predicting the sub-block and the corresponding extended prediction block size. For example, the top-left prediction block 1514 may be identified from a reference frame based on the motion vector (MV1) associated with predicting the top-left sub-block 1510 and the identified extended prediction block size 1512 for the top-left sub-block 1510. In another example, the top-right prediction block 1524 may be identified from a reference frame based on the motion vector (MV2) associated with predicting the top-right sub-block 1510 and the identified extended prediction block size 1522 for the top-right sub-block 1520.

In some implementations, a top super-prediction sub-block 1540 for the current block 1500 may be determined by spatially combining the identified prediction blocks 1514/1524 for the partitions 1510/1520 of the current block 1500 with weighted averaging. In some implementations, each pixel in the top super-prediction sub-block 1540 may include an averaged weighted contribution from spatially corresponding, or collocated, pixels from one or more of the prediction blocks 1514/1524.

In some implementations, each pixel in the identified prediction blocks 1514/1524 may represent a predicted value of a pixel at a location in the portion of the current video frame concurrent with the super-transform. In some implementations, the identified prediction blocks 1514/1524 may include multiple collocated, or spatially concurrent, pixels. For example, a pixel located near the right edge of the top-left prediction block 1514 may be spatially concurrent with a pixel in the top-right prediction block 1524. In some implementations, a weighted value may be identified for each collocated pixel and an average of each weighted collocated pixel value may be included in the top super-prediction sub-block 1540 at the corresponding location, as indicated by the center portion 1542 of the top super-prediction sub-block 1540.

In some implementations, one or more pixels from a prediction block 1514/1524 may be omitted from the other prediction block, weighted averaging may be omitted for the pixel, and the pixel value from the prediction block may be included in the top super-prediction sub-block 1540. For example, a pixel corresponding to a pixel location near the left edge of the top-left prediction block 1514 may be omitted from the top-right prediction block 1524, and the value of the corresponding pixel in the top-left prediction block 1514 may be included at the corresponding location in the top super-prediction sub-block 1540, as indicated by the left portion 1544 of the top super-prediction sub-block 1540. In another example, a pixel corresponding to a pixel location near the right edge of the top-right prediction block 1524 may be omitted from the top-left prediction block 1514, and the value of the corresponding pixel in the top-right prediction block 1524 may be included at the corresponding location in the top super-prediction sub-block 1540, as indicated by the right portion 1546 of the top super-prediction sub-block 1540.

In some implementations, a weighted value for each collocated pixel from the prediction blocks 1514/1524 may be determined based on the number, or cardinality, of collocated pixels, the relative spatial distance of the collocated pixel from the border between the sub-block corresponding to the prediction block and an adjacent prediction block, or a combination thereof, as indicated at 1550.

As shown in FIG. 16, in some implementations, extended prediction filtering may include identifying the current block 1500. The current block 1500 may be split partitioned for prediction coding, which may include identifying a bottom-left sub-block, or partition, 1610, associated with a first motion vector (MV3) and a bottom-right sub-block, or partition, 1620, associated with a second motion vector (MV4). For example, the current block 1500 may be an N×N block, such as a 64×64 block, the bottom-left sub-block 1610 may be a $$\frac{N}{2} \times \frac{N}{2}$$

sub-block, such as a 32×32 sub-block, and the motion vector (MV3) associated with the bottom-left sub-block 1610 may indicate a corresponding $$\frac{N}{2} \times \frac{N}{2}$$

prediction block size, such as a 32×32 prediction block size. In another example, the current block 1500 may be an N×N block, such as an 64×64 block, the bottom-right sub-block 1620 may be a $$\frac{N}{2} \times \frac{N}{2}$$

sub-block, such as a 32×32 sub-block, and the motion vector (MV4) associated with the bottom-right sub-block 1620 may indicate a corresponding $$\frac{N}{2} \times \frac{N}{2}$$

prediction block size, such as a 32×32 prediction block size.

In another example, the current block 1500 may be the top-left 32×32 sub-block in a 64×64 block and a 64×64 super-transform size 1530 may be identified for super-transform coding the 64×64 block. The current 32×32 block 1600 may be partitioned into a bottom-left 16×16 sub-block 1610 and a bottom-right 16×16 sub-block 1620. The super-prediction extension size may be eight pixels. The prediction block size corresponding to the bottom-left 16×16 sub-block 1610 may be extended by 8 pixels to the above, right, and down to determine a 32×24 bottom-left extended prediction block size 1612. Extending the prediction block size corresponding to the bottom-left 16×16 sub-block 1610 to the left may be limited by the super-transform boundaries 1530 as shown. The prediction block size corresponding to the bottom-right 16×16 sub-block 1620 may be extended by 8 pixels to the above, right, down, and left to generate a 32×32 bottom-right extended prediction block size 1622.

In some implementations, extending the prediction block may include extending the prediction block from the sub-block size to the current block size and extending the prediction block from the current block size by the super-prediction extension size. For example, the current block may be an 8×8 block, the super-transform size may be greater than 8×8, and extending the prediction block size may include extending the prediction block size from the sub-block size, which may be, for example, 4×8, 8×4, or 4×4, to the current block size, 8×8, and extending the 8×8 prediction block, within the super-transform, by the super-prediction extension size to generate, for example, a 24×24 prediction block.

In some implementations, a prediction block corresponding to each sub-block of the current block may be identified based on the motion vector identified for predicting the sub-block and the corresponding extended prediction block size. For example, the bottom-left prediction block 1614 may be identified from a reference frame based on the motion vector (MV3) associated with predicting the bottom-left sub-block 1610 and the identified extended prediction block size 1612 for the bottom-left sub-block 1610. In another example, the bottom-right prediction block 1624 may be identified from a reference frame based on the motion vector (MV4) associated with predicting the bottom-right sub-block 1610 and the identified extended prediction block size 1622 for the bottom-right sub-block 1620.

In some implementations, a bottom super-prediction sub-block 1640 for the current block 1500 may be determined by spatially combining the identified prediction blocks 1614/1624 for the partitions 1610/1620 of the current block 1500 with weighted averaging. In some implementations, each pixel in the bottom super-prediction sub-block 1640 may include an averaged weighted contribution from spatially corresponding, or collocated, pixels from one or more of the prediction blocks 1614/1624.

In some implementations, each pixel in the identified prediction blocks 1614/1624 may represent a predicted value of a pixel at a location in the portion of the current video frame concurrent with the super-transform. In some implementations, the identified prediction blocks 1614/1624 may include multiple collocated, or spatially concurrent, pixels. For example, a pixel located near the right edge of the bottom-left prediction block 1614 may be spatially concurrent with a pixel in the bottom-right prediction block 1624. In some implementations, a weighted value may be identified for each collocated pixel and an average of each weighted collocated pixel value may be included in the bottom super-prediction sub-block 1640 at the corresponding location, as indicated by the center portion 1642 of the bottom super-prediction sub-block 1640.

In some implementations, one or more pixels from a prediction block 1614/1624 may be omitted from the other prediction block, weighted averaging may be omitted for the pixel, and the pixel value from the prediction block may be included in the bottom super-prediction sub-block 1640. For example, a pixel corresponding to a pixel location near the left edge of the bottom-left prediction block 1614 may be omitted from the bottom-right prediction block 1624, and the value of the corresponding pixel in the bottom-left prediction block 1614 may be included at the corresponding location in the bottom super-prediction sub-block 1640, as indicated by the left portion 1644 of the bottom super-prediction sub-block 1640. In another example, a pixel corresponding to a pixel location near the right edge of the bottom-right prediction block 1624 may be omitted from the bottom-left prediction block 1614, and the value of the corresponding pixel in the bottom-right prediction block 1624 may be included at the corresponding location in the bottom super-prediction sub-block 1640, as indicated by the right portion 1646 of the bottom super-prediction sub-block 1640.

In some implementations, a weighted value for each collocated pixel from the prediction blocks 1614/1624 may be determined based on the number, or cardinality, of collocated pixels, the relative spatial distance of the collocated pixel from the border between the sub-block corresponding to the prediction block and an adjacent prediction block, or a combination thereof, as indicated at 1650.

As shown in FIG. 17, the current block 1500 may be split partitioned into four sub-blocks 1510/1520/1610/1620. A top-left extended prediction block 1514 corresponding to the top-left sub-block 1510 may be identified based on a first motion vector (MV1), a top-right extended prediction block 1524 corresponding to the top-right sub-block 1520 may be identified based on a second motion vector (MV2), a bottom-left extended prediction block 1614 corresponding to the bottom-left sub-block 1610 may be identified based on a third motion vector (MV3), and a bottom-right extended prediction block 1624 corresponding to the bottom-right sub-block 1620 may be identified based on a fourth motion vector (MV4).

In some implementations, a top super-prediction sub-block 1540 may be determined by spatially combining the top-left and top-right prediction blocks 1514/1524 with weighted averaging, a bottom super-prediction sub-block 1640 may be determined by spatially combining the bottom-left and bottom-right prediction blocks 1614/1624 with weighted averaging, and a super-prediction block 1700 may be determined by spatially combining the top super-prediction sub-block 1540 and the bottom super-prediction sub-block 1640 with weighted averaging, as indicated at 1710.

Figure 18:
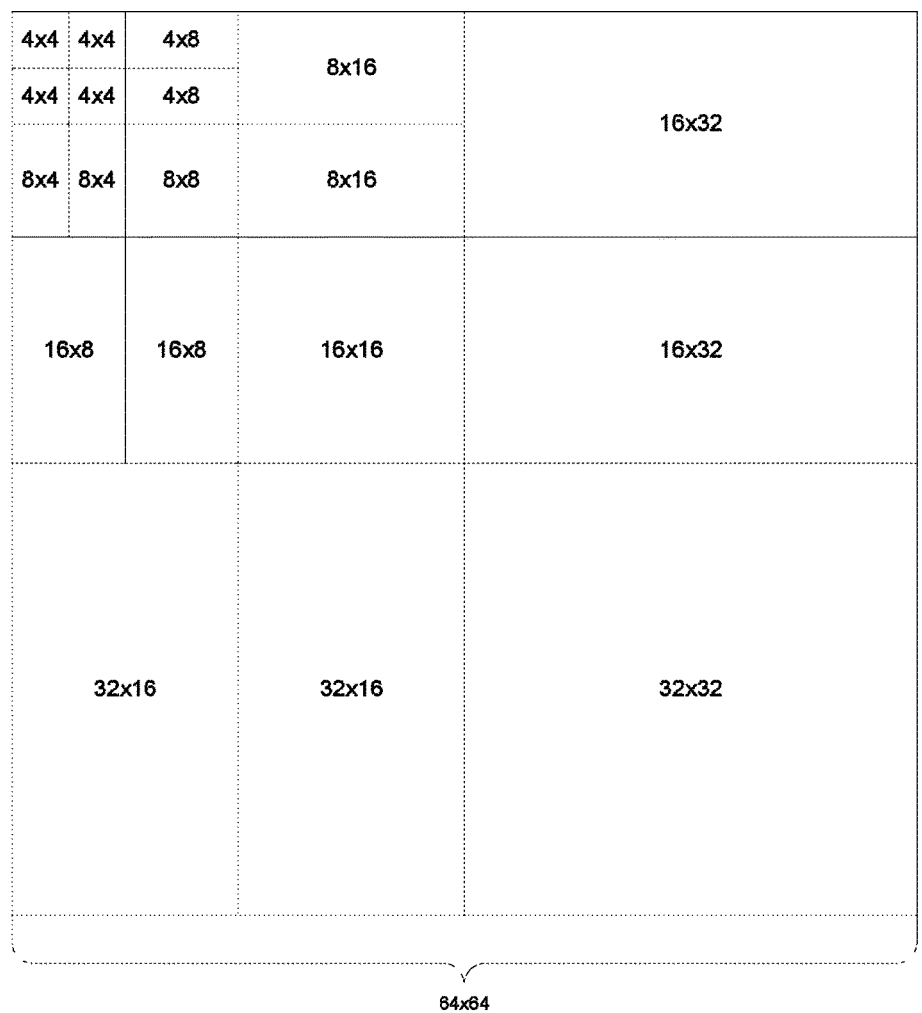
FIG. 18 is block diagrams of super-transform coding a block with multiple partitioning levels in accordance with implementations of this disclosure.

FIG. 18 is block diagrams of super-transform coding a block with multiple partitioning levels in accordance with implementations of this disclosure. In some implementations, a block, such as a 64×64 block may be vertically partitioned into two 64×32 sub-blocks (not shown), horizontally partitioned into two 32×64 sub-blocks (not shown), or split partitioned into four 32×32 sub-blocks as shown.

A 32×32 partition may be unpartitioned as shown at the bottom right of the 64×64 block, vertically partitioned into two 32×16 sub-blocks as shown at the bottom left of the 64×64 block, horizontally partitioned into two 16×32 sub-blocks as shown at the top right of the 64×64 block, or split partitioned into four 16×16 sub-blocks as shown in the top left of the 64×64 block.

A 16×16 partition may be unpartitioned as shown at the bottom right of the top left 32×32 block, vertically partitioned into two 16×8 sub-blocks as shown at the bottom left of the top left 32×32 block, horizontally partitioned into two 8×16 sub-blocks as shown at the top right of the top left 32×32 block, or split partitioned into four 8×8 sub-blocks as shown in the top left of the top left 32×32 block.

An 8×8 partition may be unpartitioned as shown at the bottom right of the top left 16×16 block of the top left 32×32 block, vertically partitioned into two 8×4 sub-blocks as shown at the bottom left of the top left 16×16 block of the top left 32×32 block, horizontally partitioned into two 4×8 sub-blocks as shown at the top right of the top left 16×16 block of the top left 32×32 block, or split partitioned into four 4×4 sub-blocks as shown in the top left of the of the top left 16×16 block of the top left 32×32 block.

The 64×64 block may be identified as the current block for super-transform coding, such as the super-transform coding shown in FIG. 8. The 64×64 current block may be split partitioned as shown and the 64×64 current block may be encoded using prediction blocks smaller than the current block size.

The four 32×32 sub-blocks may be identified for prediction coding the 64×64 current block. A 64×64 super-transform may be identified as the super-transform for coding the 64×64 current block and the 64×64 current block may be super-prediction coded, such as the super-transform coding shown in FIG. 9.

A 64×64 super-prediction block may be generated for the 64×64 current block, which may include determining a prediction block for each of the four 32×32 sub-blocks. For example, the four 32×32 sub-blocks may be super-prediction coded in raster scan order.

The top-left 32×32 sub-block may be split partitioned as shown, the top-left 32×32 sub-block may be encoded using prediction blocks smaller than the size of the top-left 32×32 sub-block, and the top-left 32×32 sub-block may be super-prediction coded using the top-left 32×32 sub-block as the current block.

A 32×32 super-prediction block may be generated for the 32×32 current block, which may include determining a prediction block for each of the four 16×16 sub-blocks. For example, the four 16×16 sub-blocks may be super-prediction coded in raster scan order.

The top-left 16×16 sub-block may be split partitioned as shown, the top-left 16×16 sub-block may be encoded using prediction blocks smaller than the size of the top-left 16×16 sub-block, and the top-left 16×16 sub-block may be super-prediction coded using the top-left 16×16 sub-block as the current block.

A 16×16 super-prediction block may be generated for the 16×16 current block, which may include determining a prediction block for each of the four 8×8 sub-blocks. For example, the four 8×8 sub-blocks may be super-prediction coded in raster scan order.

The top-left 8×8 sub-block may be split partitioned as shown, the top-left 8×8 sub-block may be encoded using prediction blocks smaller than the size of the top-left 8×8 sub-block, and the top-left 8×8 sub-block may be super-prediction coded using the top-left 8×8 sub-block as the current block.

An 8×8 super-prediction block may be generated for the 8×8 current block, which may include determining a prediction block for each of the four 4×4 sub-blocks. For example, the four 4×4 sub-blocks may be super-prediction coded in raster scan order.

The top-left 4×4 sub-block may be unpartitioned as shown and a prediction block corresponding to the top-left 4×4 sub-block may be determined. The top-right 4×4 sub-block may be unpartitioned as shown and a prediction block corresponding to the top-right 4×4 sub-block may be determined. The bottom-left 4×4 sub-block may be unpartitioned as shown and a prediction block corresponding to the bottom-left 4×4 sub-block may be determined. The bottom-right 4×4 sub-block may be unpartitioned as shown and a prediction block corresponding to the bottom-right 4×4 sub-block may be determined. The four prediction blocks for the four 4×4 partitions may be included in the 8×8 super-prediction block for the top-left 8×8 partition, which may include filtering at least a portion of each of the prediction blocks based on spatially adjacent prediction blocks.

The top-right 8×8 sub-block may be horizontally partitioned as shown, the top-right 8×8 sub-block may be encoded using prediction blocks smaller than the size of the top-right 8×8 sub-block, and the top-right 8×8 sub-block may be super-prediction coded using the top-right 8×8 sub-block as the current block.

An 8×8 super-prediction block may be generated for the 8×8 current block, which may include determining a prediction block for each of the two 4×8 sub-blocks. For example, the two 4×8 sub-blocks may be super-prediction coded in raster scan order.

The left 4×8 sub-block may be unpartitioned as shown and a prediction block corresponding to the left 4×8 sub-block may be determined. The right 4×8 sub-block may be unpartitioned as shown and a prediction block corresponding to the right 4×8 sub-block may be determined. The two prediction blocks for the two 4×8 partitions may be included in the 8×8 super-prediction block for the top-right 8×8 partition, which may include filtering at least a portion of each of the prediction blocks based on spatially adjacent prediction blocks.

The bottom-left 8×8 sub-block may be vertically partitioned as shown, the bottom-left 8×8 sub-block may be encoded using prediction blocks smaller than the size of the bottom-left 8×8 sub-block, and the bottom-left 8×8 sub-block may be super-prediction coded using the bottom-left 8×8 sub-block as the current block.

An 8×8 super-prediction block may be generated for the 8×8 current block, which may include determining a prediction block for each of the two 8×4 sub-blocks. For example, the two 8×4 sub-blocks may be super-prediction coded in raster scan order.

The top 8×4 sub-block may be unpartitioned as shown and a prediction block corresponding to the top 8×4 sub-block may be determined. The bottom 8×4 sub-block may be unpartitioned as shown and a prediction block corresponding to the bottom 8×4 sub-block may be determined. The two prediction blocks for the two 8×4 partitions may be included in the 8×8 super-prediction block for the bottom-left 8×8 partition, which may include filtering at least a portion of each of the prediction blocks based on spatially adjacent prediction blocks.

The bottom-right 8×8 sub-block may be unpartitioned as shown, the bottom-right 8×8 sub-block may be encoded using a prediction block the size of the bottom-left 8×8 sub-block, and a prediction block corresponding to the bottom-right 8×8 sub-block may be determined.

The 8×8 super-prediction block for the top-left 8×8 sub-block, the 8×8 super-prediction block for the top-right 8×8 sub-block, the 8×8 super-prediction block for the bottom-left sub-block, and the 8×8 prediction block for the bottom-right 8×8 sub-block may be included in the 16×16 super-prediction block for the top-left 16×16 partition, which may include filtering at least a portion of each of the prediction blocks based on spatially adjacent prediction blocks.

FIG. 18 is block diagrams of super-transform coding a block with multiple partitioning levels in accordance with implementations of this disclosure. In some implementations, a block, such as a 64×64 block may be vertically partitioned into two 64×32 sub-blocks (not shown), horizontally partitioned into two 32×64 sub-blocks (not shown), or split partitioned into four 32×32 sub-blocks as shown.

A 32×32 partition may be unpartitioned as shown at the bottom right of the 64×64 block, vertically partitioned into two 32×16 sub-blocks as shown at the bottom left of the 64×64 block, horizontally partitioned into two 16×32 sub-blocks as shown at the top right of the 64×64 block, or split partitioned into four 16×16 sub-blocks as shown in the top left of the 64×64 block.

A 16×16 partition may be unpartitioned as shown at the bottom right of the top left 32×32 block, vertically partitioned into two 16×8 sub-blocks as shown at the bottom left of the top left 32×32 block, horizontally partitioned into two 8×16 sub-blocks as shown at the top right of the top left 32×32 block, or split partitioned into four 8×8 sub-blocks as shown in the top left of the top left 32×32 block.

An 8×8 partition may be unpartitioned as shown at the bottom right of the top left 16×16 block of the top left 32×32 block, vertically partitioned into two 8×4 sub-blocks as shown at the bottom left of the top left 16×16 block of the top left 32×32 block, horizontally partitioned into two 4×8 sub-blocks as shown at the top right of the top left 16×16 block of the top left 32×32 block, or split partitioned into four 4×4 sub-blocks as shown in the top left of the of the top left 16×16 block of the top left 32×32 block.

The 64×64 block may be identified as the current block for super-transform coding, such as the super-transform coding shown in FIG. 8. The 64×64 current block may be split partitioned as shown and the 64×64 current block may be encoded using prediction blocks smaller than the current block size.

The four 32×32 sub-blocks may be identified for prediction coding the 64×64 current block. A 64×64 super-transform may be identified as the super-transform for coding the 64×64 current block and the 64×64 current block may be super-prediction coded, such as the super-transform coding shown in FIG. 9.

A 64×64 super-prediction block may be generated for the 64×64 current block, which may include determining a prediction block for each of the four 32×32 sub-blocks. For example, the four 32×32 sub-blocks may be super-prediction coded in raster scan order.

The top-left 32×32 sub-block may be split partitioned as shown, the top-left 32×32 sub-block may be encoded using prediction blocks smaller than the size of the top-left 32×32 sub-block, and the top-left 32×32 sub-block may be super-prediction coded using the top-left 32×32 sub-block as the current block.

A 32×32 super-prediction block may be generated for the 32×32 current block, which may include determining a prediction block for each of the four 16×16 sub-blocks. For example, the four 16×16 sub-blocks may be super-prediction coded in raster scan order.

The top-left 16×16 sub-block may be split partitioned as shown, the top-left 16×16 sub-block may be encoded using prediction blocks smaller than the size of the top-left 16×16 sub-block, and the top-left 16×16 sub-block may be super-prediction coded using the top-left 16×16 sub-block as the current block.

A 16×16 super-prediction block may be generated for the 16×16 current block, which may include determining a prediction block for each of the four 8×8 sub-blocks. For example, the four 8×8 sub-blocks may be super-prediction coded in raster scan order.

The top-left 8×8 sub-block may be split partitioned as shown, the top-left 8×8 sub-block may be encoded using prediction blocks smaller than the size of the top-left 8×8 sub-block, and the top-left 8×8 sub-block may be super-prediction coded using the top-left 8×8 sub-block as the current block.

An 8×8 super-prediction block may be generated for the 8×8 current block, which may include determining a prediction block for each of the four 4×4 sub-blocks. For example, the four 4×4 sub-blocks may be super-prediction coded in raster scan order.

The top-left 4×4 sub-block may be unpartitioned as shown and a prediction block corresponding to the top-left 4×4 sub-block may be determined. The top-right 4×4 sub-block may be unpartitioned as shown and a prediction block corresponding to the top-right 4×4 sub-block may be determined. The bottom-left 4×4 sub-block may be unpartitioned as shown and a prediction block corresponding to the bottom-left 4×4 sub-block may be determined. The bottom-right 4×4 sub-block may be unpartitioned as shown and a prediction block corresponding to the bottom-right 4×4 sub-block may be determined. The four prediction blocks for the four 4×4 partitions may be included in the 8×8 super-prediction block for the top-left 8×8 partition, which may include filtering at least a portion of each of the prediction blocks based on spatially adjacent prediction blocks.

The top-right 8×8 sub-block may be horizontally partitioned as shown, the top-right 8×8 sub-block may be encoded using prediction blocks smaller than the size of the top-right 8×8 sub-block, and the top-right 8×8 sub-block may be super-prediction coded using the top-right 8×8 sub-block as the current block.

An 8×8 super-prediction block may be generated for the 8×8 current block, which may include determining a prediction block for each of the two 4×8 sub-blocks. For example, the two 4×8 sub-blocks may be super-prediction coded in raster scan order.

The top 4×8 sub-block may be unpartitioned as shown and a prediction block corresponding to the top 4×8 sub-block may be determined. The bottom 4×8 sub-block may be unpartitioned as shown and a prediction block corresponding to the bottom 4×8 sub-block may be determined. The two prediction blocks for the two 4×8 partitions may be included in the 8×8 super-prediction block for the top-right 8×8 partition, which may include filtering at least a portion of each of the prediction blocks based on spatially adjacent prediction blocks.

The bottom-left 8×8 sub-block may be vertically partitioned as shown, the bottom-left 8×8 sub-block may be encoded using prediction blocks smaller than the size of the bottom-left 8×8 sub-block, and the bottom-left 8×8 sub-block may be super-prediction coded using the bottom-left 8×8 sub-block as the current block.

An 8×8 super-prediction block may be generated for the 8×8 current block, which may include determining a prediction block for each of the two 8×4 sub-blocks. For example, the two 8×4 sub-blocks may be super-prediction coded in raster scan order.

The left 8×4 sub-block may be unpartitioned as shown and a prediction block corresponding to the left 8×4 sub-block may be determined. The right 8×4 sub-block may be unpartitioned as shown and a prediction block corresponding to the right 8×4 sub-block may be determined. The two prediction blocks for the two 8×4 partitions may be included in the 8×8 super-prediction block for the bottom-left 8×8 partition, which may include filtering at least a portion of each of the prediction blocks based on spatially adjacent prediction blocks.

The bottom-right 8×8 sub-block may be unpartitioned as shown, the bottom-right 8×8 sub-block may be encoded using a prediction block the size of the bottom-right 8×8 sub-block, and a prediction block corresponding to the bottom-right 8×8 sub-block may be determined.

The 8×8 super-prediction block for the top-left 8×8 sub-block, the 8×8 super-prediction block for the top-right 8×8 sub-block, the 8×8 super-prediction block for the bottom-left 8×8 sub-block, and the 8×8 prediction block for the bottom-right 8×8 sub-block may be included in the 16×16 super-prediction block for the top-left 16×16 partition, which may include filtering at least a portion of each of the prediction blocks based on spatially adjacent prediction blocks.

The top-right 16×16 sub-block may be horizontally partitioned as shown, the top-right 16×16 sub-block may be encoded using prediction blocks smaller than the size of the top-right 16×16 sub-block, and the top-right 16×16 sub-block may be super-prediction coded using the top-right 16×16 sub-block as the current block.

A 16×16 super-prediction block may be generated for the 16×16 current block, which may include determining a prediction block for each of the two 8×16 sub-blocks. For example, the two 8×16 sub-blocks may be super-prediction coded in raster scan order.

The top 8×16 sub-block may be unpartitioned as shown and a prediction block corresponding to the top 8×16 sub-block may be determined. The bottom 8×16 sub-block may be unpartitioned as shown and a prediction block corresponding to the bottom 8×16 sub-block may be determined. The two prediction blocks for the two 8×16 partitions may be included in the 16×16 super-prediction block for the top-right 16×16 partition, which may include filtering at least a portion of each of the prediction blocks based on spatially adjacent prediction blocks.

The bottom-left 16×16 sub-block may be vertically partitioned as shown, the bottom-left 16×16 sub-block may be encoded using prediction blocks smaller than the size of the bottom-left 16×16 sub-block, and the bottom-left 16×16 sub-block may be super-prediction coded using the bottom-left 16×16 sub-block as the current block.

A 16×16 super-prediction block may be generated for the 16×16 current block, which may include determining a prediction block for each of the two 16×8 sub-blocks. For example, the two 16×8 sub-blocks may be super-prediction coded in raster scan order.

The left 16×8 sub-block may be unpartitioned as shown and a prediction block corresponding to the left 16×8 sub-block may be determined. The right 16×8 sub-block may be unpartitioned as shown and a prediction block corresponding to the right 16×8 sub-block may be determined. The two prediction blocks for the two 16×8 partitions may be included in the 16×16 super-prediction block for the bottom-left 16×16 partition, which may include filtering at least a portion of each of the prediction blocks based on spatially adjacent prediction blocks.

The bottom-right 16×16 sub-block may be unpartitioned as shown, the bottom-right 16×16 sub-block may be encoded using a prediction block the size of the bottom-right 16×16 sub-block, and a prediction block corresponding to the bottom-right 16×16 sub-block may be determined.

The 16×16 super-prediction block for the top-left 16×16 sub-block, the 16×16 super-prediction block for the top-right 16×16 sub-block, the 16×16 super-prediction block for the bottom-left 16×16 sub-block, and the 16×16 prediction block for the bottom-right 16×16 sub-block may be included in the 32×32 super-prediction block for the top-left 32×32 partition, which may include filtering at least a portion of each of the prediction blocks based on spatially adjacent prediction blocks.

The top-right 32×32 sub-block may be horizontally partitioned as shown, the top-right 32×32 sub-block may be encoded using prediction blocks smaller than the size of the top-right 32×32 sub-block, and the top-right 32×32 sub-block may be super-prediction coded using the top-right 32×32 sub-block as the current block.

A 32×32 super-prediction block may be generated for the 32×32 current block, which may include determining a prediction block for each of the two 16×32 sub-blocks. For example, the two 16×32 sub-blocks may be super-prediction coded in raster scan order.

The top 16×32 sub-block may be unpartitioned as shown and a prediction block corresponding to the top 16×32 sub-block may be determined. The bottom 16×32 sub-block may be unpartitioned as shown and a prediction block corresponding to the bottom 16×32 sub-block may be determined. The two prediction blocks for the two 16×32 partitions may be included in the 32×32 super-prediction block for the top-right 32×32 partition, which may include filtering at least a portion of each of the prediction blocks based on spatially adjacent prediction blocks.

The bottom-left 32×32 sub-block may be vertically partitioned as shown, the bottom-left 32×32 sub-block may be encoded using prediction blocks smaller than the size of the bottom-left 32×32 sub-block, and the bottom-left 32×32 sub-block may be super-prediction coded using the bottom-left 32×32 sub-block as the current block.

An 32×32 super-prediction block may be generated for the 32×32 current block, which may include determining a prediction block for each of the two 16×8 sub-blocks. For example, the two 16×8 sub-blocks may be super-prediction coded in raster scan order.

The left 16×8 sub-block may be unpartitioned as shown and a prediction block corresponding to the left 16×8 sub-block may be determined. The right 16×8 sub-block may be unpartitioned as shown and a prediction block corresponding to the right 16×8 sub-block may be determined. The two prediction blocks for the two 16×8 partitions may be included in the 32×32 super-prediction block for the bottom-left 32×32 partition, which may include filtering at least a portion of each of the prediction blocks based on spatially adjacent prediction blocks.

The bottom-right 32×32 sub-block may be unpartitioned as shown, the bottom-right 32×32 sub-block may be encoded using a prediction block the size of the bottom-right 32×32 sub-block, and a prediction block corresponding to the bottom-right 32×32 sub-block may be determined.

The 32×32 super-prediction block for the top-left 32×32 sub-block, the 32×32 super-prediction block for the top-right 32×32 sub-block, the 32×32 super-prediction block for the bottom-left 32×32 sub-block, and the 32×32 prediction block for the bottom-right 32×32 sub-block may be included in the 64×64 super-prediction block, which may include filtering at least a portion of each of the prediction blocks based on spatially adjacent prediction blocks.

Figure 19:
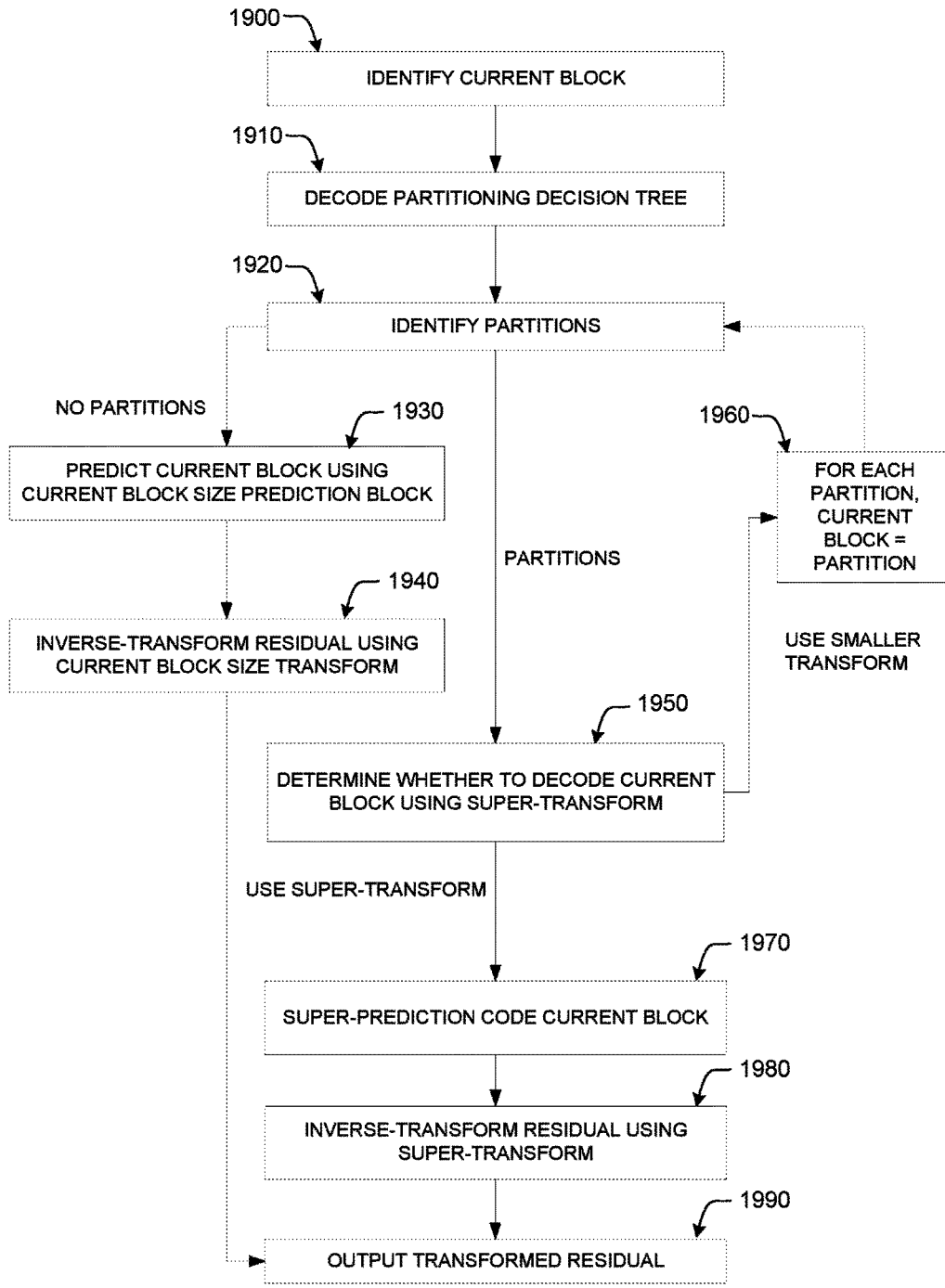
FIG. 19 is a diagram of an example of video decoding including super-transform decoding in accordance with implementations of this disclosure.

FIG. 19 is a diagram of an example of video decoding including super-transform decoding in accordance with implementations of this disclosure. In some implementations, video decoding may include super-transform decoding. For example, a prediction unit, such as the intra/inter prediction unit 540 shown in FIG. 5, a transform unit, such as the transform unit 530 shown in FIG. 5, or a combination thereof of a decoder, such as the decoder 500 shown in FIG. 5, may perform super-transform decoding.

In some implementations, video decoding including super-transform decoding may include identifying a current block at 1900, decoding a partitioning decision tree at 1910, identifying partitions at 1920, predicting the current block using a corresponding size prediction block at 1930, transforming the residual using the current block sized transform at 1940, determining whether to decode the current block using a super-transform at 1950, super-transform decoding each partition at 1960, super-prediction coding the current block at 1970, transforming the residual using the super-transform at 1980, outputting the transformed block at 1990, or a combination thereof.

In some implementations, a current block may be identified at 1900. In some implementations, identifying the current block at 1900 may include decoding information indicating the current block from and encoded bitstream, such as a block header. For example, a 64×64 block, such as the bottom-left 64×64 block 610 shown in FIG. 6, may be identified as the current block.

In some implementations, a partitioning decision tree may be decoded at 1910. In some implementations, the encoded bitstream may include a flag, such as a bit, indicating whether the current block is super-transform coded using a super-transform size corresponding to the current block size. In some implementations, a flag indicating whether a sub-block included within a larger super-transform is super-transform coded using a super-transform size corresponding to the sub-block size may be omitted from the encoded bitstream.

In some implementations, partitions may be identified at 1920. For example, the partitioning decision tree may indicate no partitioning for the current block or the partitioning decision tree may indicate partitioning for the current block.

In some implementations, the current block may be predicted using a corresponding size prediction block at 1930. For example, the partitioning decision tree may indicate no partitioning for the current block and a prediction block having a size corresponding to the current block may be identified.

In some implementations, the residual may be transformed using the current block sized transform at 1940. For example, transform coefficients, may be decoded from the encoded video stream and transformed using a transform having a size corresponding to the current block size to generate the residual. The decoded residual may be output as shown at 1990.

In some implementations, whether to decode the current block using a super-transform may be determined at 1950. For example, the partitioning decision tree may indicate partitions for prediction coding the current block and the encoded bitstream may include a flag, such as a bit, indicating whether to use a super-transform having a size corresponding to the current block size for decoding the current block.

In some implementations, each partition may be super-transform decoded at 1960. For example, the encoded bitstream may omit a flag indicating the use of a super-transform having a size corresponding to the current block size, or the encoded bitstream may include a flag indicating that the use of smaller transforms for decoding the partitions of the current block, and each partition for the current block may be super-transform decoded using the sub-block as the current block.

In some implementations, the current block may be super-prediction coded at 1970. For example, the encoded bitstream may include a flag indicating the use of a super-transform for the current block, and the current block may be super-prediction coded at 1970, which may be similar to the super-prediction coding shown in FIG. 8. For example, super-prediction coding the current block may include recursively traversing the partitioning decision tree to the lowest level and generating a super-prediction block for each partitioned block by super-prediction coding the sub-blocks of the respective block.

In some implementations, the residual may be transformed using the super-transform at 1980. For example, transform coefficients may be decoded from the encoded bitstream, and the transform coefficients may be inverse transformed using a super-transform having a size corresponding to the current block.

In some implementations, the inverse-transformed residual may be output at 1990. For example, super-prediction coding the current block at 1970 may generate a super-prediction block having a size corresponding to the current block size, the super-prediction block may be added to the inverse-transformed residual generated at 1980 to generate a reconstructed block, and the reconstructed block may be include in a reconstructed frame, which may be output for storage or display.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. An apparatus for use in super-transform coding, the apparatus comprising:
   a non-transitory computer-readable memory including instructions for super-transform coding; and
   a processor, operatively coupled to the non-transitory computer-readable memory, for receiving the instructions from the non-transitory computer-readable memory and executing the instructions for super-transform coding comprising:
      identifying an input block from a current frame from an input video stream;
      super-transform coding the input block using the input block as a current block, wherein super-transform coding includes:
         in response to a determination to encode the current block using a prediction block size corresponding to a size of the current block:
            determining a prediction block corresponding to the current block, the prediction block having a prediction block size corresponding to the size of the current block; and
            generating a transform block based on the prediction block using a transform having a transform size within the prediction block size;
         in response to a determination to encode the current block using a prediction block size smaller than the size of the current block:
            identifying sub-blocks from the current block for prediction coding the current block, wherein a first sub-block from the sub-blocks is spatially adjacent to a second sub-block from the sub-blocks in the current block;
            in response to a determination to encode the current block using a transform having a transform size smaller than the size of the current block, super-transform coding each sub-block from the sub-blocks using the respective sub-block as the current block; and
            in response to a determination to encode the current block using a super-transform having a super-transform size corresponding to the size of the current block, generating, as the transform block, a super-transform block by transforming a super-prediction block for the current block using the super-transform, wherein the super-prediction block for the current block has a super-prediction block size corresponding to the size of the current block, and wherein generating the super-transform block includes generating the super-prediction block for the current block by super-prediction coding the current block, wherein super-prediction coding includes:
               for each sub-block from the sub-blocks:
                  in response to a determination to encode the sub-block using a prediction block size corresponding to a size of the sub-block, determining a prediction block for the sub-block based on a motion vector associated with the sub-block;
                  in response to a determination to encode the sub-block using a prediction block size smaller than the size of the sub-block:
                     identifying partitions from the sub-block for prediction coding the sub-block, wherein a first partition from the partitions is spatially adjacent to a second partition from the partitions in the sub-block; and
                     generating, as the prediction block, a super-prediction block for the sub-block, wherein the super-prediction block for the sub-block has a super-prediction block size corresponding to the size of the sub-block, wherein generating the super-prediction block for the sub-block includes super-prediction coding the sub-block using the sub-block as the current block and using the partitions as the sub-blocks;
                  generating a filtered prediction block by filtering at least a portion of the prediction block based on a spatially adjacent prediction block from the super-prediction block for the current block; and
                  including the filtered prediction block in the super-prediction block for the current block; and
         including the transform block in an output bitstream; and
      transmitting or storing the output bitstream.

2. The apparatus of claim 1, wherein the processor executes the instructions such that:
   including the transform block in the output bitstream includes including a super-transform flag in the output bitstream.

3. The apparatus of claim 1, wherein the processor executes the instructions such that:
   including the filtered prediction block in the super-prediction block for the current block includes:
   on a condition that the current block is a horizontally partitioned block wherein the prediction block corresponds to a top sub-block from the current block including the filtered prediction block as a top block in the super-prediction block;
   on a condition that the current block is a horizontally partitioned block wherein the prediction block corresponds to a bottom sub-block from the current block including the filtered prediction block as a bottom block in the super-prediction block;
   on a condition that the current block is a vertically partitioned block wherein the prediction block corresponds to a left sub-block from the current block including the filtered prediction block as a left block in the super-prediction block;
   on a condition that the current block is a vertically partitioned block wherein the prediction block corresponds to a right sub-block from the current block including the filtered prediction block as a right block in the super-prediction block;
   on a condition that the current block is a split partitioned block wherein the prediction block corresponds to a top-left sub-block from the current block or a top-right sub-block from the current block:
     on a condition that the prediction block corresponds to the top-left sub-block from the current block, including the filtered prediction block as a left block in a top super-prediction sub-block;
     on a condition that the prediction block corresponds to the top-right sub-block from the current block, including the filtered prediction block as a right block in the top super-prediction sub-block;
     generating a filtered top super-prediction sub-block by filtering at least a portion of the top super-prediction sub-block based on a bottom super-prediction sub-block; and
     including the filtered top super-prediction sub-block as a top block in the super-prediction block; and
   on a condition that the current block is a split partitioned block wherein the prediction block corresponds to a bottom-left sub-block from the current block or a bottom-right sub-block from the current block:
     on a condition that the prediction block corresponds to the bottom-left sub-block from the current block, including the filtered prediction block as a left block in the bottom super-prediction sub-block;
     on a condition that the prediction block corresponds to the bottom-right sub-block from the current block, including the filtered prediction block as a right block in the bottom super-prediction sub-block;
     generating a filtered bottom super-prediction sub-block by filtering at least a portion of the bottom super-prediction sub-block based on the top super-prediction sub-block; and
     including the filtered bottom super-prediction sub-block as a bottom block in the super-prediction block.

4. The apparatus of claim 1, wherein the processor executes the instructions such that filtering includes:
   on a condition that the current block is a horizontally partitioned block wherein the prediction block corresponds to a top sub-block from the current block and the spatially adjacent prediction block corresponds to a bottom sub-block from the current block, smoothing a bottom portion of the prediction block based on a top portion of the spatially adjacent prediction block;
   on a condition that the current block is a horizontally partitioned block wherein the prediction block corresponds to the bottom sub-block from the current block and the spatially adjacent prediction block corresponds to the top sub-block from the current block, smoothing a top portion of the prediction block based on a bottom portion of the spatially adjacent prediction block;
   on a condition that the current block is a vertically partitioned block wherein the prediction block corresponds to a left sub-block from the current block and the spatially adjacent prediction block corresponds to a right sub-block from the current block, smoothing a right portion of the prediction block based on a left portion of the spatially adjacent prediction block;
   on a condition that the current block is a vertically partitioned block wherein the prediction block corresponds to the right sub-block from the current block and the spatially adjacent prediction block corresponds to the left sub-block from the current block, smoothing a left portion of the prediction block based on a right portion of the spatially adjacent prediction block;
   on a condition that the current block is a split partitioned block wherein the prediction block corresponds to a top-left sub-block from the current block and the spatially adjacent prediction block corresponds to a top-right sub-block from the current block, smoothing a right portion of the prediction block based on a left portion of the spatially adjacent prediction block;
   on a condition that the current block is a split partitioned block wherein the prediction block corresponds to the top-right sub-block from the current block and the spatially adjacent prediction block corresponds to the top-left sub-block from the current block, smoothing a left portion of the prediction block based on a right portion of the spatially adjacent prediction block;
   on a condition that the current block is a split partitioned block wherein the prediction block corresponds to a bottom-left sub-block from the current block and the spatially adjacent prediction block corresponds to a bottom-right sub-block from the current block, smoothing a right portion of the prediction block based on a left portion of the spatially adjacent prediction block; and
   on a condition that the current block is a split partitioned block wherein the prediction block corresponds to the bottom-right sub-block from the current block and the spatially adjacent prediction block corresponds to the bottom-left sub-block from the current block, smoothing a left portion of the prediction block based on a right portion of the spatially adjacent prediction block.

5. The apparatus of claim 4, wherein the processor executes the instructions such that smoothing includes using a deblocking filter.

6. The apparatus of claim 1, wherein the processor executes the instructions such that determining the prediction block for the sub-block includes:
   determining an extended prediction block size, wherein determining the extended prediction block size includes extending the prediction block size by a super-prediction extension size; and
   determining the prediction block based on the extended prediction block size and the motion vector associated with the sub-block.

7. The apparatus of claim 6, wherein the processor executes the instructions such that extending the prediction block size includes:
   extending the prediction block size to include pixel locations within the super-transform.

8. The apparatus of claim 6, wherein the processor executes the instructions such that extending the prediction block size includes:
   on a condition that a vertical distance between a top-left pixel location in the sub-block and a top-left pixel location in the super-transform is at least the super-prediction extension size:
      on a condition that a horizontal distance between the top-left pixel location in the sub-block and the top-left pixel location in the super-transform is at least the super-prediction extension size:
         on a condition that a vertical distance between a bottom-right pixel location in the sub-block and a bottom-right pixel location in the super-transform is at least the super-prediction extension size:
            on a condition that a horizontal distance between the bottom-right pixel location in the sub-block and the bottom-right pixel location in the super-transform is at least the super-prediction extension size, extending the prediction block size by super-prediction extension size pixel locations above the prediction block, to the left of the prediction block, above and to the left of the prediction block, below the prediction block, below and to the left of the prediction block, to the right of the prediction block, below and to the right of the prediction block, and above and to the right of the prediction block; and
            on a condition that the horizontal distance between the bottom-right pixel location in the sub-block and the bottom-right pixel location in the super-transform is less than the super-prediction extension size, extending the prediction block size by super-prediction extension size pixel locations above the prediction block, to the left of the prediction block, above and to the left of the prediction block, below and to the left of the prediction block, and below the prediction block; and
         on a condition that the vertical distance between the bottom-right pixel location in the sub-block and the bottom-right pixel location in the super-transform is less than the super-prediction extension size:
            on a condition that the horizontal distance between the bottom-right pixel location in the sub-block and the bottom-right pixel location in the super-transform is at least the super-prediction extension size, extending the prediction block size by super-prediction extension size pixel locations above the prediction block, to the left of the prediction block, above and to the left of the prediction block, above and to the right of the prediction block, and to the right of the prediction block; and
            on a condition that the horizontal distance between the bottom-right pixel location in the sub-block and the bottom-right pixel location in the super-transform is less than the super-prediction extension size, extending the prediction block size by super-prediction extension size pixel locations above the prediction block, above and to the left of the prediction block, and to the left of the prediction block; and
      on a condition that the horizontal distance between the top-left pixel location in the sub-block and the top-left pixel location in the super-transform is less than the super-prediction extension size:
         on a condition that the vertical distance between the bottom-right pixel location in the sub-block and the bottom-right pixel location in the super-transform is at least the super-prediction extension size:
            on a condition that the horizontal distance between the bottom-right pixel location in the sub-block and the bottom-right pixel location in the super-transform is at least the super-prediction extension size, extending the prediction block size by super-prediction extension size pixel locations above the prediction block, below the prediction block, above and to the right of the prediction block, below and to the right of the prediction block, and to the right of the prediction block; and
            on a condition that the horizontal distance between the bottom-right pixel location in the sub-block and the bottom-right pixel location in the super-transform is less than the super-prediction extension size, extending the prediction block size by super-prediction extension size pixel locations above the prediction block and below the prediction block; and
         on a condition that the vertical distance between the bottom-right pixel location in the sub-block and the bottom-right pixel location in the super-transform is less than the super-prediction extension size:
            on a condition that the horizontal distance between the bottom-right pixel location in the sub-block and the bottom-right pixel location in the super-transform is at least the super-prediction extension size, extending the prediction block size by super-prediction extension size pixel locations above the prediction block, above and to the right of the prediction block, and to the right of the prediction block; and
            on a condition that the horizontal distance between the bottom-right pixel location in the sub-block and the bottom-right pixel location in the super-transform is less than the super-prediction extension size, extending the prediction block size by super-prediction extension size pixel locations above the prediction block; and
   on a condition that the vertical distance between the top-left pixel location in the sub-block and the top-left pixel location in the super-transform is less than the super-prediction extension size:
      on a condition that the horizontal distance between the top-left pixel location in the sub-block and the top-left pixel location in the super-transform is at least the super-prediction extension size:
on a condition that the vertical distance between the bottom-right pixel location in the sub-block and the bottom-right pixel location in the super-transform is at least the super-prediction extension size:
on a condition that the horizontal distance between the bottom-right pixel location in the sub-block and the bottom-right pixel location in the super-transform is at least the super-prediction extension size, extending the prediction block size by super-prediction extension size pixel locations to the left of the prediction block, below the prediction block, below and to the left of the prediction block, below and to the right of the prediction block, and to the right of the prediction block; and
on a condition that the horizontal distance between the bottom-right pixel location in the sub-block and the bottom-right pixel location in the super-transform is less than the super-prediction extension size, extending the prediction block size by super-prediction extension size pixel locations to the left of the prediction block, below and to the left of the prediction block, and below the prediction block; and
on a condition that the vertical distance between the bottom-right pixel location in the sub-block and the bottom-right pixel location in the super-transform is less than the super-prediction extension size:
on a condition that the horizontal distance between the bottom-right pixel location in the sub-block and the bottom-right pixel location in the super-transform is at least the super-prediction extension size, extending the prediction block size by super-prediction extension size pixel locations to the left of the prediction block and to the right of the prediction block; and
on a condition that the horizontal distance between the bottom-right pixel location in the sub-block and the bottom-right pixel location in the super-transform is less than the super-prediction extension size, extending the prediction block size by super-prediction extension size pixel locations to the left of the prediction block; and
on a condition that the horizontal distance between the top-left pixel location in the sub-block and the top-left pixel location in the super-transform is less than the super-prediction extension size:
on a condition that the vertical distance between the bottom-right pixel location in the sub-block and the bottom-right pixel location in the super-transform is at least the super-prediction extension size:
on a condition that the horizontal distance between the bottom-right pixel location in the sub-block and the bottom-right pixel location in the super-transform is at least the super-prediction extension size, extending the prediction block size by super-prediction extension size pixel locations below the prediction block, below and to the right of the prediction block and to the right of the prediction block; and
on a condition that the horizontal distance between the bottom-right pixel location in the sub-block and the bottom-right pixel location in the super-transform is less than the super-prediction extension size, extending the prediction block size by super-prediction extension size pixel locations below the prediction block; and
on a condition that the vertical distance between the bottom-right pixel location in the sub-block and the bottom-right pixel location in the super-transform is less than the super-prediction extension size, and on a condition that the horizontal distance between the bottom-right pixel location in the sub-block and the bottom-right pixel location in the super-transform is at least the super-prediction extension size, extending the prediction block size by super-prediction extension size pixel locations to the right of the prediction block.

9. The apparatus of claim 6, wherein the processor executes the instructions such that determining the extended prediction block size includes:
on a condition that the super-transform size exceeds 8×8 and on a condition that the current block size is 8×8:
determining a first extended prediction block size by extending the prediction block size to be concurrent with the current block size; and
extending the first extended prediction block size by the super-prediction extension size.

10. The apparatus of claim 6, wherein the processor executes the instructions such that filtering includes:
identifying a plurality of pixels from the prediction block;
for each pixel from the plurality of pixels:
on a condition that the spatially adjacent prediction block includes a collocated pixel, wherein the collocated pixel is spatially concurrent with the pixel:
determining a weighted value for the pixel based on a value of the pixel; and
including the weighted value for the pixel in the filtered prediction block; and
on a condition that the spatially adjacent prediction block omits the collocated pixel, including the value of the pixel in the filtered prediction block.

11. The apparatus of claim 10, wherein the processor executes the instructions such that determining the weighted value for the pixel includes:
determining the weighted value of the pixel as a product of the value of the pixel and a weight for the pixel, wherein the weight for the pixel is based on a perpendicular distance between a location of the pixel and a boundary between the sub-block and a sub-block corresponding to the spatially adjacent prediction block.

12. The apparatus of claim 11, wherein the processor executes the instructions such that including the filtered prediction block in the super-prediction block for the current block includes:
identifying a plurality of filtered pixels from the filtered prediction block, wherein each filtered pixel from the plurality of filtered pixels corresponds with a respective pixel location in the super-prediction block;
for each filtered pixel from the plurality of filtered pixels:
on a condition that the super-prediction block includes a collocated filtered pixel, wherein the collocated filtered pixel is spatially concurrent with the filtered pixel, including an average of a value of the filtered pixel and a value of the collocated filtered pixel in the super-prediction block at respective pixel location; and
on a condition that the super-prediction block omits the collocated filtered pixel, including the value of the filtered pixel in the super-prediction block at respective pixel location.

13. An apparatus for use in super-transform coding, the apparatus comprising:
- a non-transitory computer-readable memory including instructions for super-transform coding; and
- a processor, operatively coupled to the non-transitory computer-readable memory, for receiving the instructions from the non-transitory computer-readable memory and executing the instructions for super-transform coding comprising:
  - identifying an input block from a current frame from an input video stream;
  - super-transform coding the input block using the input block as a current block, wherein super-transform coding includes:
    - in response to a determination to encode the current block using a prediction block size corresponding to a size of the current block:
      - determining a prediction block corresponding to the current block, the prediction block having a prediction block size corresponding to the size of the current block; and
      - generating a transform block based on the prediction block using a transform having a transform size within the prediction block size;
    - in response to a determination to encode the current block using a prediction block size smaller than the size of the current block:
      - identifying a plurality of sub-blocks from the current block for prediction coding the current block, wherein a first sub-block from the plurality of sub-blocks is spatially adjacent to a second sub-block from the plurality of sub-blocks in the current block;
    - in response to a determination to encode the current block using a transform having a transform size smaller than the size of the current block, super-transform coding each sub-block from the plurality of sub-blocks using the respective sub-block as the current block; and
    - in response to a determination to encode the current block using a super-transform having a super-transform size corresponding to the size of the current block, generating, as the transform block, a super-transform block by transforming a super-prediction block for the current block using the super-transform, wherein the super-prediction block for the current block has a super-prediction block size corresponding to the size of the current block, and wherein generating the super-transform block includes generating the super-prediction block for the current block by super-prediction coding the current block, wherein super-prediction coding includes:
      - for each sub-block from the plurality of sub-blocks:
        - in response to a determination to encode the sub-block using a prediction block size corresponding to a size of the sub-block:
          - determining an extended prediction block size, wherein determining the extended prediction block size includes extending the prediction block size by a super-prediction extension size; and
          - determining the prediction block based on the extended prediction block size, the super-transform, and a motion vector associated with the sub-block;
        - in response to a determination to encode the sub-block using a prediction block size smaller than the size of the sub-block:
          - identifying a plurality of partitions from the sub-block for prediction coding the sub-block, wherein a first partition from the plurality of partitions is spatially adjacent to a second partition from the plurality of partitions in the sub-block; and
          - generating, as the prediction block, a super-prediction block for the sub-block, wherein the super-prediction block for the sub-block has a super-prediction block size corresponding to the size of the sub-block, wherein generating the super-prediction block for the sub-block includes super-prediction coding the sub-block using the sub-block as the current block and using the plurality of partitions as the plurality of sub-blocks;
      - generating a filtered prediction block by filtering at least a portion of the prediction block based on a spatially adjacent prediction block from the super-prediction block for the current block; and
      - including the filtered prediction block in the super-prediction block for the current block; and
    - including the transform block in an output bitstream; and
  - transmitting or storing the output bitstream.

14. The apparatus of claim 13, wherein the processor executes the instructions such that including the transform block in the output bitstream include including a super-transform flag in the output bitstream.

15. The apparatus of claim 13, wherein the processor executes the instructions such that extending the prediction block size includes:
- on a condition that a vertical distance between a top-left pixel location in the sub-block and a top-left pixel location in the super-transform is at least the super-prediction extension size:
  - on a condition that a horizontal distance between the top-left pixel location in the sub-block and the top-left pixel location in the super-transform is at least the super-prediction extension size:
  - on a condition that a vertical distance between a bottom-right pixel location in the sub-block and a bottom-right pixel location in the super-transform is at least the super-prediction extension size:
  - on a condition that a horizontal distance between the bottom-right pixel location in the sub-block and the bottom-right pixel location in the super-transform is at least the super-prediction extension size, extending the prediction block size by super-prediction extension size pixel locations above the prediction block, to the left of the prediction block, above and to the left of the prediction block, below the prediction block, below and to the left of the prediction block, to the right of the prediction block, below and to the right of the prediction block, and above and to the right of the prediction block; and on a condition that the horizontal distance between the bottom-right pixel location in the sub-block and the bottom-right pixel location in the super-transform is less than the super-prediction extension size, extending the prediction block size by super-prediction extension size pixel locations above the prediction block, to the left of the prediction block, above and to the left of the prediction block, below and to the left of the prediction block, and below the prediction block; and on a condition that the vertical distance between the bottom-right pixel location in the sub-block and the bottom-right pixel location in the super-transform is less than the super-prediction extension size:
- on a condition that the horizontal distance between the bottom-right pixel location in the sub-block and the bottom-right pixel location in the super-transform is at least the super-prediction extension size, extending the prediction block size by super-prediction extension size pixel locations above the prediction block, to the left of the prediction block, above and to the left of the prediction block, above and to the right of the prediction block, and to the right of the prediction block; and
- on a condition that the horizontal distance between the bottom-right pixel location in the sub-block and the bottom-right pixel location in the super-transform is less than the super-prediction extension size, extending the prediction block size by super-prediction extension size pixel locations above the prediction block, above and to the left of the prediction block, and to the left of the prediction block; and on a condition that the horizontal distance between the top-left pixel location in the sub-block and the top-left pixel location in the super-transform is less than the super-prediction extension size:
- on a condition that the vertical distance between the bottom-right pixel location in the sub-block and the bottom-right pixel location in the super-transform is at least the super-prediction extension size:
  - on a condition that the horizontal distance between the bottom-right pixel location in the sub-block and the bottom-right pixel location in the super-transform is at least the super-prediction extension size, extending the prediction block size by super-prediction extension size pixel locations above the prediction block, below the prediction block, above and to the right of the prediction block, below and to the right of the prediction block, and to the right of the prediction block; and
  - on a condition that the horizontal distance between the bottom-right pixel location in the sub-block and the bottom-right pixel location in the super-transform is less than the super-prediction extension size, extending the prediction block size by super-prediction extension size pixel locations above the prediction block and below the prediction block; and
- on a condition that the vertical distance between the bottom-right pixel location in the sub-block and the bottom-right pixel location in the super-transform is less than the super-prediction extension size:
  - on a condition that the horizontal distance between the bottom-right pixel location in the sub-block and the bottom-right pixel location in the super-transform is at least the super-prediction extension size, extending the prediction block size by super-prediction extension size pixel locations above the prediction block, above and to the right of the prediction block, and to the right of the prediction block; and
  - on a condition that the horizontal distance between the bottom-right pixel location in the sub-block and the bottom-right pixel location in the super-transform is less than the super-prediction extension size, extending the prediction block size by super-prediction extension size pixel locations above the prediction block; and on a condition that the vertical distance between the top-left pixel location in the sub-block and the top-left pixel location in the super-transform is less than the super-prediction extension size:
- on a condition that the horizontal distance between the top-left pixel location in the sub-block and the top-left pixel location in the super-transform is at least the super-prediction extension size:
  - on a condition that the vertical distance between the bottom-right pixel location in the sub-block and the bottom-right pixel location in the super-transform is at least the super-prediction extension size:
    - on a condition that the horizontal distance between the bottom-right pixel location in the sub-block and the bottom-right pixel location in the super-transform is at least the super-prediction extension size, extending the prediction block size by super-prediction extension size pixel locations to the left of the prediction block, below the prediction block, below and to the left of the prediction block, below and to the right of the prediction block, and to the right of the prediction block; and
    - on a condition that the horizontal distance between the bottom-right pixel location in the sub-block and the bottom-right pixel location in the super-transform is less than the super-prediction extension size, extending the prediction block size by super-prediction extension size pixel locations to the left of the prediction block, below and to the left of the prediction block, and below the prediction block; and
  - on a condition that the vertical distance between the bottom-right pixel location in the sub-block and the bottom-right pixel location in the super-transform is less than the super-prediction extension size:
    - on a condition that the horizontal distance between the bottom-right pixel location in the sub-block and the bottom-right pixel location in the super-transform is at least the super-prediction extension size, extending the prediction block size by super-prediction extension size pixel locations to the left of the prediction block and to the right of the prediction block; and
    - on a condition that the horizontal distance between the bottom-right pixel location in the sub-block and the bottom-right pixel location in the super-transform is less than the super-prediction extension size, extending the prediction block size by super-prediction extension size pixel locations to the left of the prediction block; and on a condition that the horizontal distance between the top-left pixel location in the sub-block and the top-left pixel location in the super-transform is less than the super-prediction extension size:

on a condition that the vertical distance between the bottom-right pixel location in the sub-block and the bottom-right pixel location in the super-transform is at least the super-prediction extension size:

on a condition that the horizontal distance between the bottom-right pixel location in the sub-block and the bottom-right pixel location in the super-transform is at least the super-prediction extension size, extending the prediction block size by super-prediction extension size pixel locations below the prediction block, below and to the right of the prediction block and to the right of the prediction block; and on a condition that the horizontal distance between the bottom-right pixel location in the sub-block and the bottom-right pixel location in the super-transform is less than the super-prediction extension size, extending the prediction block size by super-prediction extension size pixel locations below the prediction block; and on a condition that the vertical distance between the bottom-right pixel location in the sub-block and the bottom-right pixel location in the super-transform is less than the super-prediction extension size, and on a condition that the horizontal distance between the bottom-right pixel location in the sub-block and the bottom-right pixel location in the super-transform is at least the super-prediction extension size, extending the prediction block size by super-prediction extension size pixel locations to the right of the prediction block.

16. The apparatus of claim 13, wherein the processor executes the instructions such that determining the extended prediction block size includes:

on a condition that the super-transform size exceeds 8×8 and on a condition that the current block size is 8×8:
determining a first extended prediction block size by extending the prediction block size to be concurrent with the current block size; and
extending the first extended prediction block size by the super-prediction extension size.

17. The apparatus of claim 13, wherein the processor executes the instructions such that filtering includes:

identifying a plurality of pixels from the prediction block;
for each pixel from the plurality of pixels:
on a condition that the spatially adjacent prediction block includes a collocated pixel, wherein the collocated pixel is spatially concurrent with the pixel:
determining a weighted value for the pixel based on a value of the pixel; and
including the weighted value for the pixel in the filtered prediction block; and
on a condition that the spatially adjacent prediction block omits the collocated pixel, including the value of the pixel in the filtered prediction block.

18. The apparatus of claim 17, wherein the processor executes the instructions such that determining the weighted value for the pixel includes:

determining the weighted value of the pixel as a product of the value of the pixel and a weight for the pixel, wherein the weight for the pixel is based on a perpendicular distance between a location of the pixel and a boundary between the sub-block and a sub-block corresponding to the spatially adjacent prediction block.

19. The apparatus of claim 18, wherein the processor executes the instructions such that including the filtered prediction block in the super-prediction block for the current block includes:

identifying a plurality of filtered pixels from the filtered prediction block, wherein each filtered pixel from the plurality of filtered pixels corresponds with a respective pixel location in the super-prediction block;
for each filtered pixel from the plurality of filtered pixels:
on a condition that the super-prediction block includes a collocated filtered pixel, wherein the collocated filtered pixel is spatially concurrent with the filtered pixel, including an average of a value of the filtered pixel and a value of the collocated filtered pixel in the super-prediction block at respective pixel location; and
on a condition that the super-prediction block omits the collocated filtered pixel, including the value of the filtered pixel in the super-prediction block at respective pixel location.

20. An apparatus for use in super-transform coding, the apparatus comprising:

a non-transitory computer-readable memory including instructions for super-transform coding; and
a processor, operatively coupled to the non-transitory computer-readable memory, for receiving the instructions from the non-transitory computer-readable memory and executing the instructions for super-transform coding comprising:
identifying a plurality of sub-blocks for prediction coding a current block;
in response to a determination to encode the current block using a super-transform, super-prediction coding the current block, wherein super-prediction coding includes:
generating a super-prediction block for the current block by:
for each unpartitioned sub-block from the current block:
generating a prediction block; and
including the prediction block in the super-prediction block for the current block;
for each partitioned sub-block from the current block:
generating a super-prediction block for the sub-block by super-prediction coding the sub-block, and
including the super-prediction block for the sub-block as a prediction block in the super-prediction block for the current block; and
filtering at least a portion of each prediction block from the super-prediction block for the current block based on a spatially adjacent prediction block from the super-prediction block for the current block;
generating a residual based on the super-prediction block for the current block;
generating a plurality of transform coefficients by transforming the residual using a super-transform having a super-transform size corresponding to a size of the current block;

including the plurality of transform coefficients in an output bitstream; and including a super-transform flag in the output bitstream; and transmitting or storing the output bitstream.

* * * * *